(12) United States Patent
Wakimura

(10) Patent No.: US 6,567,782 B1
(45) Date of Patent: May 20, 2003

(54) PORTABLE INFORMATION TERMINAL, METHOD OF PROCESSING AUDIO DATA, RECORDING MEDIUM, AND PROGRAM

(75) Inventor: Takayuki Wakimura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 97 days.

(21) Appl. No.: 09/614,863

(22) Filed: Jul. 12, 2000

(30) Foreign Application Priority Data

Jul. 12, 1999 (JP) ............................................ 11-198121

(51) Int. Cl.[7] ............................ G10L 21/04; G10L 21/06
(52) U.S. Cl. ........................ 704/500; 704/275; 704/270; 704/270.1; 704/504
(58) Field of Search ............................... 704/500–502, 704/270–275, 219, 229, 202–204, 224, 265; 341/107; 381/94.2

(56) References Cited

U.S. PATENT DOCUMENTS

| 4,357,489 | A | * | 11/1982 | Henderson et al. | ......... 704/265 |
| 5,206,884 | A | * | 4/1993 | Bhaskar | ...................... 704/219 |
| 5,548,574 | A | * | 8/1996 | Shimoyoshi et al. | ....... 704/204 |
| 5,583,967 | A | | 12/1996 | Akagiri | ..................... 395/2.38 |
| 5,717,394 | A | * | 2/1998 | Schwartz et al. | ........... 341/107 |
| 5,727,123 | A | * | 3/1998 | McDonough et al. | ....... 704/224 |
| 5,742,694 | A | * | 4/1998 | Eatwell | ...................... 381/94.2 |
| 6,353,703 | B1 | * | 3/2002 | Tatsumi et al. | .............. 704/229 |

FOREIGN PATENT DOCUMENTS

EP 0 661 827 A2 7/1995
EP 0 992 268 A2 4/2000

OTHER PUBLICATIONS

Ngan et al ("A Hybrid Image Coding Scheme using CVQ and DCT", IEEE International Symposium on Circuits and Systems, pp. 408–411 Jun. 1991).*
P. Noll, "Wideband Speech and Audio Coding," IEEE Communications Magazine, vol. 31, No. 11, Nov. 1993, pp. 34–44.
M. Iwadare et al., "A 128 kb/s Hi–Fi Audio CODEC Based on Adaptive Transform Coding with Adaptive Block Size MDCT," IEEE Journal on Selected Areas in Communications, vol. 10, No. 1, 1992, pp. 138–144.
Taiwan Patent Publication No. 332280, May 21, 1998, first page only. Note: U.S. Patent No. 5,583,967 is the corresponding U.S. document of the above Taiwanese publication.

* cited by examiner

Primary Examiner—Doris H. To
Assistant Examiner—Daniel Nolan
(74) Attorney, Agent, or Firm—Paul A. Guss

(57) ABSTRACT

An expansion processor has a buffer defining unit for defining one of two buffers as a present inverse quantization buffer and defining one of two buffers as a present restoration buffer, an inverse quantization processor for inversely quantizing a quantized value read for each sample from a DCT data buffer, an IDCT processor for effecting an IDCT process on the inversely quantized data to restore time-domain audio data from frequency-domain data, a low-pass filter processor for removing a high-frequency component from the restored audio data, and an audio data output unit for outputting successive restored samples of audio data to a DAC to output sound from a speaker.

33 Claims, 37 Drawing Sheets

FIG. 15

PCM DATA FILE

| | j=0 | j=1 | j=2 | ••• | | | | | |
|---|---|---|---|---|---|---|---|---|---|
| SAMPLE 0 | BLOCK | BLOCK | BLOCK | BLOCK | BLOCK | BLOCK | BLOCK | BLOCK | k=0 |
| SAMPLE 1 | BLOCK | BLOCK | BLOCK | BLOCK | BLOCK | BLOCK | BLOCK | BLOCK | k=1 |

FIG. 19

QUANTIZATION TABLE

| | | |
|---|---|---|
| RECORD 0 | MAXIMUM VALUE | $i=0$ |
| RECORD 1 | | $i=1$ |
| RECORD 2 | | $i=2$ |
| ⋮ | ⋮ | ⋮ |
| RECORD 7 | | $i=7$ |

B

PORTABLE INFORMATION TERMINAL, METHOD OF PROCESSING AUDIO DATA, RECORDING MEDIUM, AND PROGRAM

BACKGROUND OF THE INVENTION

1. Field of the Invention

The present invention relates to a portable information terminal for use as a portable telephone set, a PHS (Portable Handy-phone System) terminal, a portable game machine, or a PDA (Personal Digital Assistant), a method of processing audio data for compressing and expanding audio data used in the portable information terminal, a recording medium which stores a program for carrying out at least the method of processing audio data and data to be referred to by the program, and a program for carrying out the method of processing audio data.

2. Description of the Related Art

Generally, an audio coding process removes redundancy from audio data so as to be able to handle the audio data in a reduced amount of information. The audio coding process is an indispensable technology for digital audio data transmission, e.g., audio data transmission via portable telephone and the Internet, and digital audio data storage, e.g., audio data storage in CD-ROMs, DVDs (Digital Video Discs), and MDs (Mini Discs).

The audio coding process utilizes audio data properties and human auditory characteristics in order to code audio data efficiently.

The audio coding process is based on various techniques including nonuniform quantization, predictive coding, differential PCM, subband coding based on human auditory and visual characteristics, and transform coding.

According to the transform coding technique, for example, a time-domain signal is sliced with a window ranging from 5 to 50 ms, converted into a frequency domain by DCT (Discrete Cosine Transform) or DFT (Discrete Fourier Transform), classified into a corresponding group with a critical bandwidth, and coded with a minimum number required of quantization bits in view of masking.

Specifically, audio data is converted into a frequency domain by MDCT (Modified Discrete Cosine Transform), and also subjected to FFT (Fast Fourier Transform). A masking threshold value for each critical band is determined from the FFT signal, and the MDCT audio data is quantized and thereafter subjected to variable-length coding, i.e., entropy coding such as Huffman coding.

The encoded audio data is decoded by variable-length decoding and inverse quantization, and then inverse DCT (IDCT) to restore time-domain data, i.e., audio data.

In order to meet demands for smaller size and weight, efforts have been made to improve portable information terminals such as portable telephone sets, PHS terminals, portable game machines, or PDAs by employing piezoelectric speakers and small memories of reduced storage capacity for operating programs.

A program for achieving the audio coding process (hereinafter referred to as "audio coding program") is made up of a vast number of steps. If the audio coding program is ported directly to a portable information terminal, then the following programs are liable to arise:

(1) Since it is necessary to provide a storage capacity large enough to store the audio coding program, there is a greater need for a memory for storing the audio coding program.

(2) If no sufficient storage capacity is available, then the audio coding program cannot be made resident. Therefore, each time there is a request for audio data output, the audio coding program must be stored in a working area and activated. However, the process leads to a reduction in the processing speed, and the timing for audio data output is liable to be retarded.

(3) Because the number of steps of the audio coding program is large, the audio coding program is required to be paged frequently. The frequent paging process is liable to increase the processing time and operational errors.

SUMMARY OF THE INVENTION

It is therefore an object of the present invention to provide a portable information terminal having a simplified audio coding program that is capable of quickly processing audio data.

Another object of the present invention is to provide a method of processing audio data which is suitable for the processing of audio data in a portable information terminal.

Still another object of the present invention is to provide a recording medium which stores a program for quickly processing audio data that is suitable for the processing of audio data in a portable information terminal, and data to be referred to by the program.

A portable information terminal according to the present invention has a memory for storing data, expansion processing means stored in the memory, for expanding compressed data which has not been subjected to variable-length coding, into audio data, sound output means for converting the audio data into sound and outputting the sound, and a plurality of data buffers accessible by at least the expansion processing means, for successively selectively reading and writing at least the audio data.

The expansion processing means expands the compressed data to restore the audio data. The compressed data has not been subjected to variable-length coding.

Generally, Huffman coding is used as the variable-length coding (entropy coding). If the variable-length coding employed, the number of steps required to decode the data is increased, resulting in an increase in the size of a program that is used to expand the compressed data.

According to the present invention, no decoding process is required because the expansion processing means expands the compressed data which has not been subjected to variable-length coding, and hence the number of steps carried out by the expansion processing means is greatly reduced. As a result, the compressed data can quickly be restored without having to increase the storage capacity of the memory.

Furthermore, since the plural data buffers are used, no data interference occurs during the processing, and the compressed data can be expanded quickly with high accuracy.

If the number of data based on a processable number that is preset to meet the performance of at least the sound output means is regarded as one sample, then the expansion processing means may comprise means for expanding the compressed data for each sample. Therefore, the compressed data can be expanded depending on the specifications of the portable information terminal, preventing sound from being outputted out of synchronism with displayed images.

The expansion processing means may comprise inverse quantization processing means for inversely quantizing the compressed data into inversely quantized data, and IDCT processing means for effecting an IDCT process on the inversely quantized data to produce the audio data, the data buffers including two inverse quantization buffers accessible for successively selectively reading and writing the inversely quantized data, and two audio data buffers accessible for successively selectively reading and writing the audio data.

The IDCT processing means may comprise means for effecting the IDCT process using a cosine table which has been generated in advance. With the cosine table used, the IDCT process is simplified, and the compressed data can be expanded more quickly.

The IDCT processing means may have low-pass filter processing means for logically effecting a low-pass filter on IDCT-processed data to reduce a high-frequency component contained therein.

The portable information terminal may further comprise communication means for sending data to and receiving data from an external device, the compressed data comprising data stored in the memory via the communication means.

The compressed data may comprise data which is produced when uncompressed data recorded in a recording medium accessible via the external device is compressed by the external device, or may comprise data which is recorded in a recording medium accessible via the external device and compressed when recorded in the recording medium.

The uncompressed data may be compressed by effecting a DCT process on the uncompressed data to produce DCT-processed data and quantizing the DCT-processed data. The DCT-processed data may be quantized by determining maximum values at respective frequencies of the DCT-processed data to generate a quantization table containing the maximum values at the respective frequencies, and dividing the DCT-processed data by the maximum values at the respective frequencies in the quantization table to produce quantized data.

Preferably, the compressed data may comprise data containing reduced noise. The noise may be reduced by calculating a total of samples in original data to produce an original total value, compressing the original data and expanding the compressed original data to produce restored data, calculating a total of samples in the restored data to produce a restored total value, comparing the original total value and the restored total value with each other, and correcting the original data depending on the result of comparison.

According to the present invention, there is also provided a method of processing audio data, comprising the steps of expanding compressed data which has not been subjected to variable-length coding, into audio data, using a plurality of data buffers accessible for successively selectively reading and writing at least the audio data, and outputting the audio data to sound output means to output sound.

The method allows audio data to be quickly processed, and hence is suitable for audio data processing in a portable information terminal.

If the number of data based on a processable number that is preset to meet the performance of at least the sound output means is regarded as one sample, then the step of expanding compressed data may comprise the step of expanding the compressed data for each sample.

The step of expanding compressed data may comprise the steps of inversely quantizing the compressed data into inversely quantized data, and effecting an IDCT process on the inversely quantized data to produce the audio data, the arrangement being such that the inversely quantized data is successively selectively read and written using two inverse quantization buffers, and the audio data is successively selectively read and written using two audio data buffers.

The step of effecting an IDCT process may comprise the step of effecting the IDCT process using a cosine table which has been generated in advance.

The step of effecting an IDCT process may comprise the step of logically effecting a low-pass filter on IDCT-processed data to reduce a high-frequency component contained therein.

The method may further comprise step of generating the compressed data, the step of generating the compressed data comprising the steps of effecting a DCT process on uncompressed data to produce DCT-processed data, and quantizing the DCT-processed data.

The step of quantizing the DCT-processed data may comprise the steps of determining maximum values at respective frequencies of the DCT-processed data to generate a quantization table containing the maximum values at the respective frequencies, and dividing the DCT-processed data by the maximum values at the respective frequencies in the quantization table to produce quantized data.

Preferably, the compressed data may comprise data containing reduced noise. The method may further comprise the step of reducing noise, the step of reducing noise comprising the steps of calculating a total of samples in original data to produce an original total value, compressing the original data and expanding the compressed original data to produce restored data, calculating a total of samples in the restored data to produce a restored total value, comparing the original total value and the restored total value with each other, and correcting the original data depending on the result of comparison.

According to the present invention, there is also provided a recording medium which stores a program operable on a portable information terminal having a memory for storing data, sound output means for converting the audio data into sound and outputting the sound, a plurality of data buffers accessible for successively selectively reading and writing at least the audio data, and also stores data referred to by the program, the program comprising the step of expanding compressed data which has not been subjected to variable-length coding, stored in the memory, using the data buffers, thereby to produce audio data.

The recording medium stores the program which allows audio data to be quickly processed, and hence is suitable for audio data processing in the portable information terminal.

In the above program, if the number of data based on a processable number that is preset to meet the performance of at least the sound output means is regarded as one sample, then the step of expanding compressed data comprises the step of expanding the compressed data for each sample.

The portable information terminal may have two inverse quantization buffers accessible for successively selectively reading and writing the inversely quantized data, and two audio data buffers accessible for successively selectively reading and writing the audio data, and the step of expanding compressed data may comprise the steps of inversely quantizing the compressed data into inversely quantized data, and effecting an IDCT process on the inversely quantized data to produce the audio data. The step of effecting an IDCT process may comprise the step of effecting the IDCT process using a cosine table which has been generated in advance. The step of effecting an IDCT process may comprise the step of logically effecting a low-pass filter on IDCT-processed data to reduce a high-frequency component contained therein.

The recording medium may store the compressed data as well as the program.

The program may comprise the step of compressing uncompressed data, the uncompressed data as well as the program being stored in the recording medium.

According to the present invention, there is further provided a program operable on a portable information terminal having a memory for storing various data, sound output means for converting the audio data into sound and outputting the sound, a plurality of data buffers accessible for successively selectively reading and writing at least the audio data, and also stores data referred to by the program, the program being readable and executable by a computer, the program comprising the step of expanding compressed data which has not been subjected to variable-length coding, stored in the memory, using the data buffers, thereby to produce audio data.

The program allows audio data to be quickly processed, and hence is suitable for audio data processing in the portable information terminal.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a diagram showing details of a PCM data file;

FIG. 19 is a diagram showing details of a quantization table;

DESCRIPTION OF THE PREFERRED EMBODIMENTS

A portable information terminal according to the present invention that can be used as a portable game machine, software for achieving a method of processing audio data according to the present invention, and a recording medium which stores the software will be described below with reference to FIGS. 1 through 37.

Prior to the description of a portable information terminal 18 according to the present invention, an entertainment system 30 to which the portable information terminal 18 is connected will be described below with reference to FIGS. 1 through 7.

Figure 1:
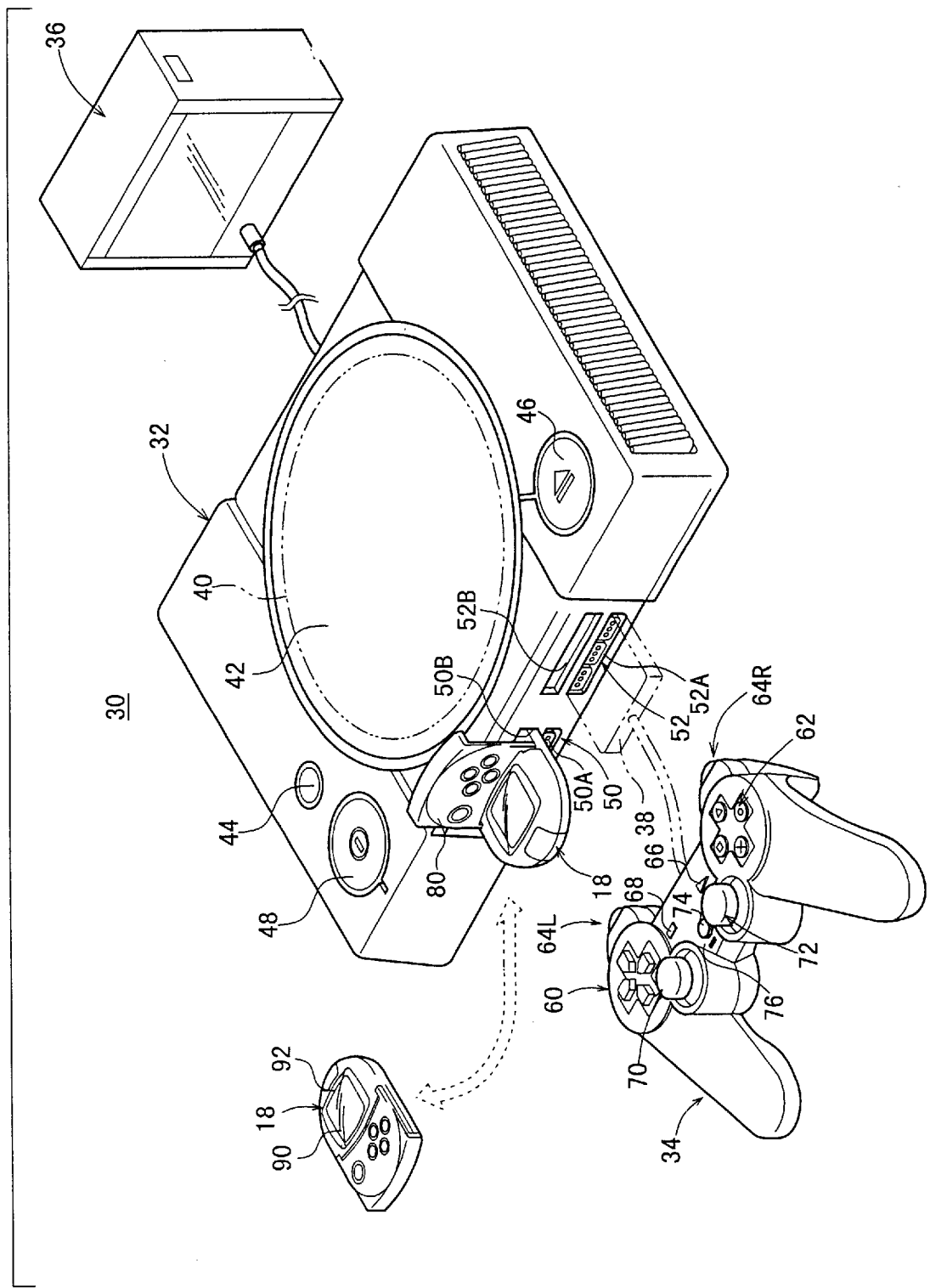
FIG. 1 is a perspective view of an entertainment system to which a portable information terminal according to the present invention is connected.
Figure 2:
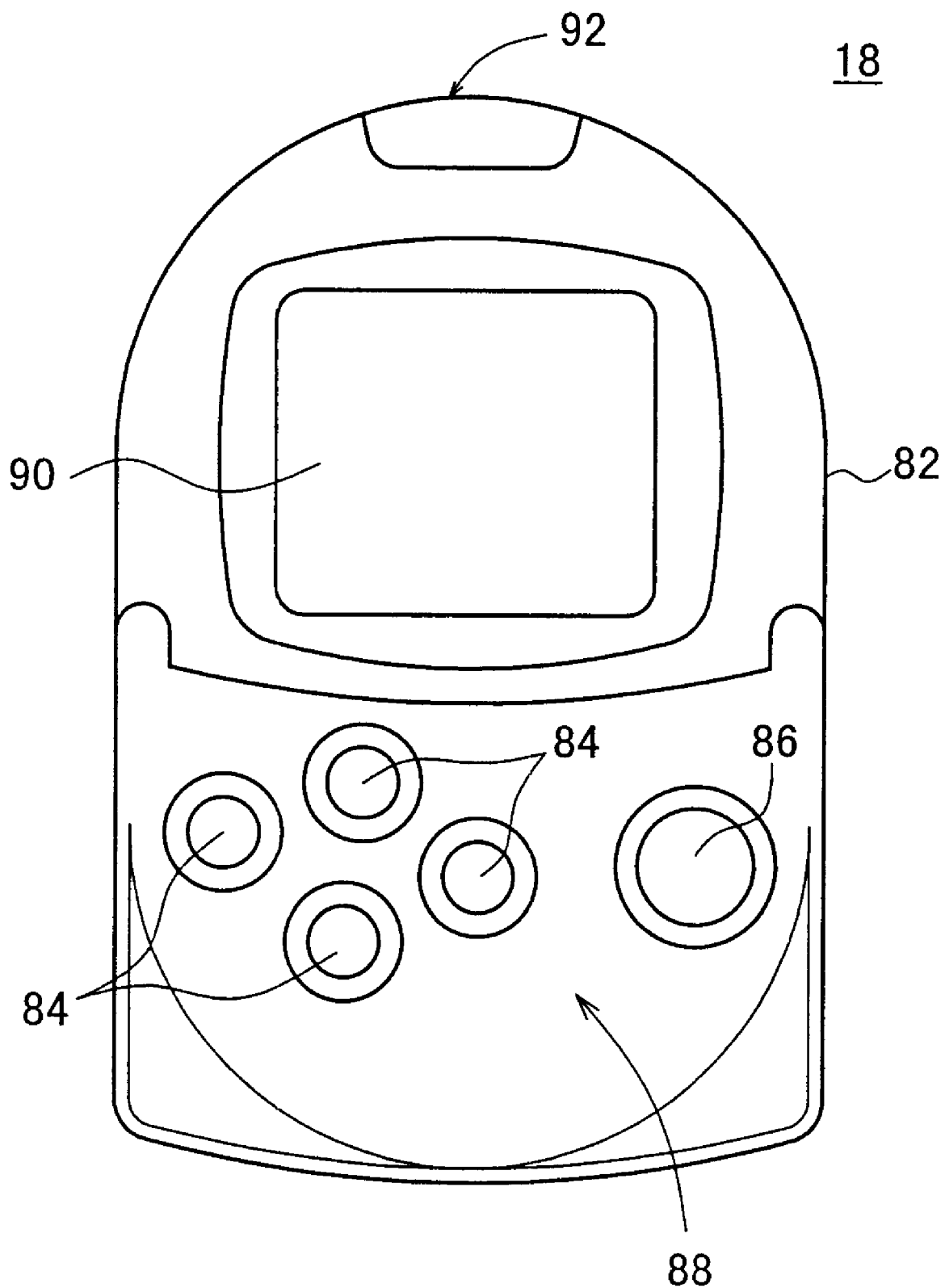
FIG. 2 is a plan view of the portable information terminal according to the present invention.

As shown in FIG. 1, the entertainment system 30 includes an entertainment apparatus 32 which serves as a master unit for the portable information terminal 18, the portable information terminal 18 detachably connected to the entertainment apparatus 32, a manual controller 34 detachably connected to the entertainment apparatus 32 by a connector 38, and a display monitor 36 such as a television receiver which is supplied with video and audio output signals from the entertainment apparatus 32.

The entertainment apparatus 32 can read a program recorded in a mass storage medium such as an optical disk 40 such as a CD-ROM, for example, and execute a game, for example, based on the program depending on commands supplied from the user, e.g., the game player. The execution of the game mainly represents controlling the progress of the game by controlling the display of images and the generation of sounds on the display monitor 36 in response to input signals from the manual controller 34.

The entertainment apparatus 32 is essentially in the shape of a flat rectangular parallelepiped, and has a disk loading unit 42 in which an optical disk 40 is disposed centrally therein to store an application program and data of a video game or the like, a reset switch 44 for arbitrarily resetting a program which is being executed at present, a disk control switch 46 for controlling the loading of the optical disk 40, a power supply switch 48, and two slots 50, 52, for example.

The entertainment apparatus 32 may be supplied with the application program via a communication link, rather than being supplied from the optical disk 40 as the recording medium.

The slots 50, 52 have respective upper slot units 50B, 52B and respective lower slot units 50A, 52A. Manual controllers 34 can be connected respectively to the lower slot units 50A, 52A. Memory cards (not sown) or portable information terminals 18 which also function as memory cards can be connected to respectively to the upper slot units 50B, 52B. The slots 50 (50A, 50B) and the slots 52 (52A, 52B) are of asymmetrical shapes to avoid erroneous insertion of manual controllers and memory cards or portable information terminals.

The manual controller 34 has first and second control pads 60, 62, an L button 64L, an R button 64R, a start button 66, and a selection button 68. The manual controller 34 also has first and second swivel control members 70, 72 for making analog control actions, a mode selection switch 74 for selecting control modes of the swivel control members 70, 72, and an indicator 76 for indicating a selected control mode.

As shown in FIG. 1, the portable information terminal 18 with a lid 80 being open is connected to the entertainment apparatus 32. A program and data are downloaded from the entertainment apparatus 32 into the portable information terminal 18 which is connected to the entertainment apparatus 32. In this sense, the entertainment apparatus 32 is considered to be a downloading apparatus.

When the portable information terminal 18 is disconnected from the entertainment apparatus 32, stated otherwise, when the portable information terminal 18 is a standalone system, the portable information terminal 18 can be operated on a build-in battery to execute a program downloaded from the entertainment apparatus 32.

Portable information terminals 18 can be used as inherent memory cards corresponding to a plurality of manual controllers 34 connected to the entertainment apparatus 32. For example, if two users (game players) take part in playing a game on the entertainment system 30, game results of the users are recorded respectively in the portable information terminals 18.

As shown in FIGS. 2 through 5, the portable information terminal 18 has a housing 82 which supports a manual control pad 88 having a plurality of direction buttons 84 and a decision button 86 for entering events and making various selections, a display unit 90 comprising a liquid crystal display (LCD) unit or the like, and a window 92 for wireless communication via infrared radiation or the like.

Figure 3:
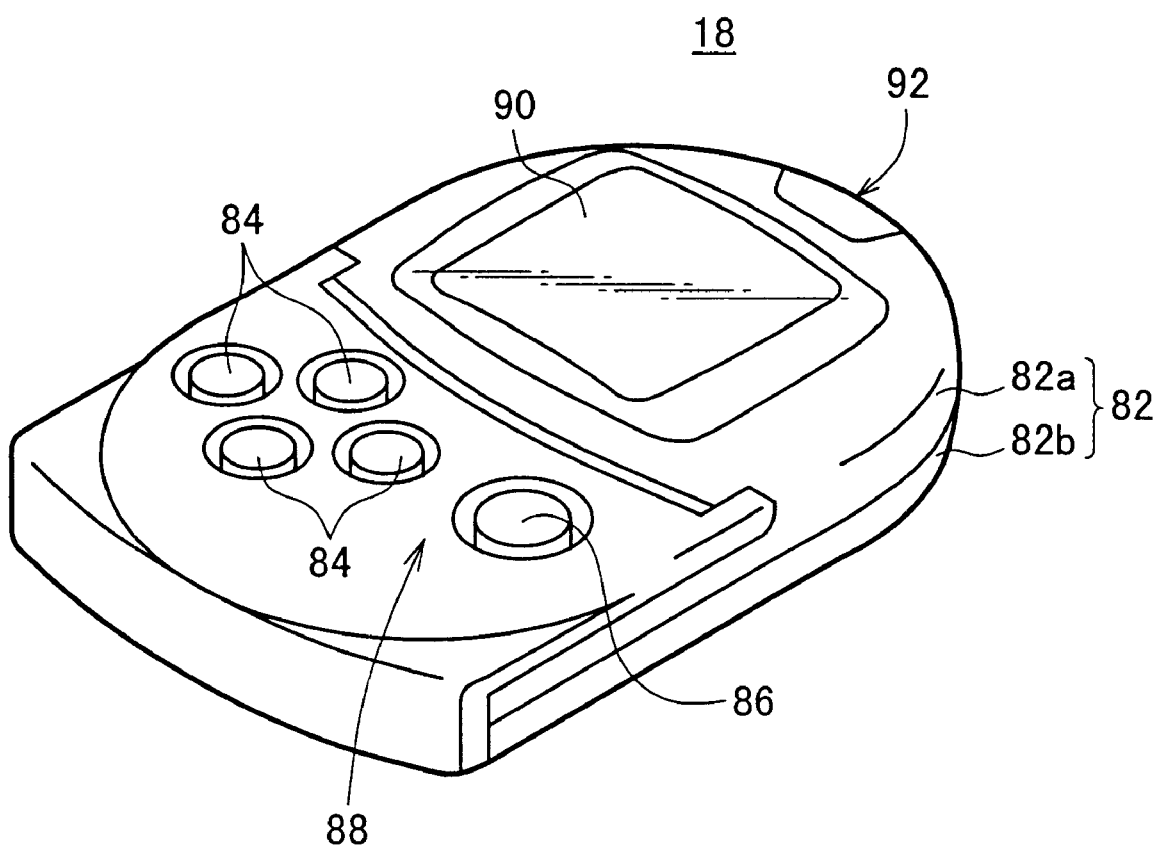
FIG. 3 is a perspective view of the portable information terminal according to the present invention.
Figure 5:
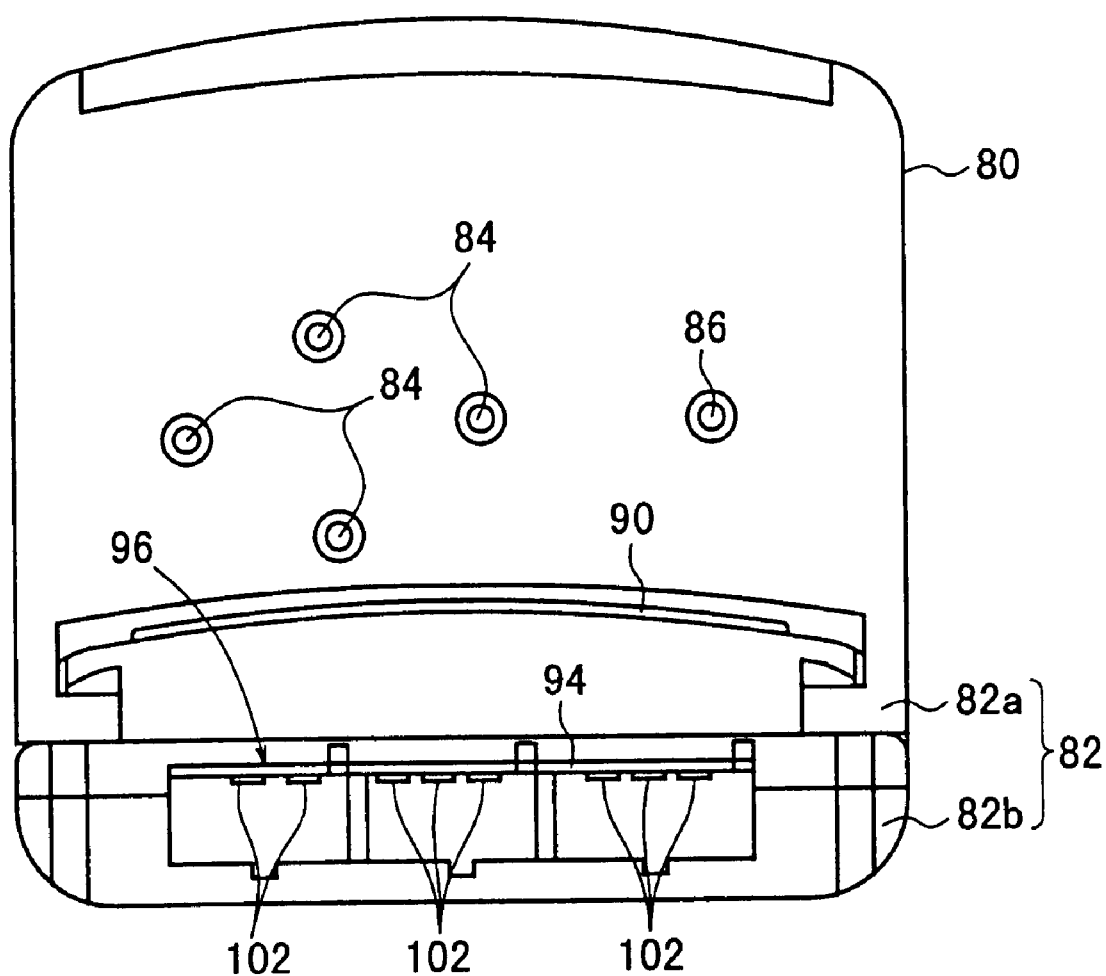
FIG. 5 is a front elevational view of the portable information terminal with the lid open.

As shown in FIG. 3, the housing 82 comprises an upper shell 82a and a lower shell 82b. The housing 82 houses a board 94 which supports a memory device, etc. thereon, as shown in FIG. 5. The housing 82 can be inserted into either one of the slots 50, 52 of the entertainment apparatus 32, and has a connector 96 disposed in an end thereof and having an elongate rectangular window.

The window 92 is disposed on an opposite end of the to housing 82 which is of a substantially semicircular shape. The display unit 90 occupies a substantially half area of the upper shell 82a and is positioned near the window 92.

Figure 4:
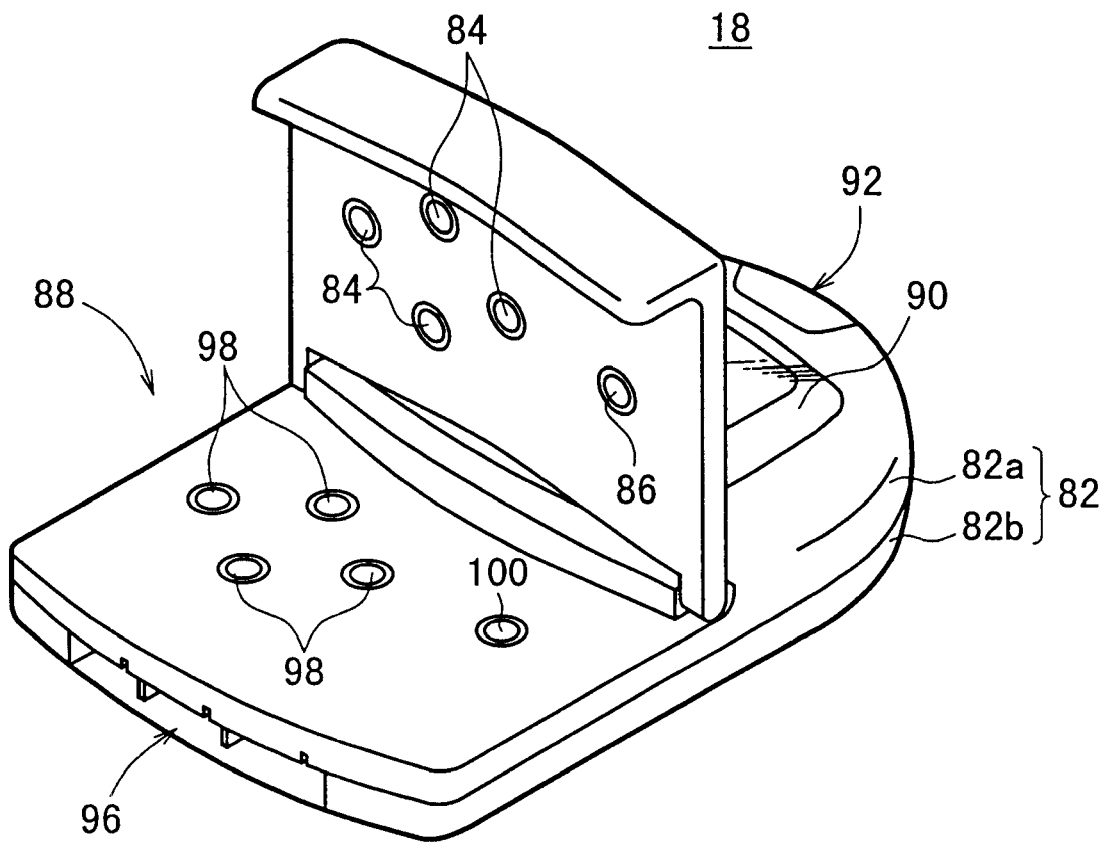
FIG. 4 is a perspective view of the portable information terminal with a lid being open.

The manual control pad 88 occupies another substantially half area of the upper shell 82a and is positioned remotely from the window 92. As shown in FIG. 4, the manual control pad 88 comprises a substantially square lid 80 that is angularly movably supported on the housing 82 and supports thereon the direction buttons 84 and the decision button 86, and switch pressers 98, 100 positioned in an area of the housing 82 which can be opened and closed by the lid 80.

The direction buttons 84 and the decision button 86 extend through the lid 80. The direction buttons 84 and the decision button 86 are supported on the lid 80 for movement into and out of the upper surface of the lid 80.

The switch pressers 98, 100 have respective pressing elements supported on the housing 82 for movement into and out of the upper surface of the housing 82. When one of the pressing elements is pressed from above, it presses a corresponding pressure switch such as a diaphragm switch, for example, mounted on the board 94 in the housing 82.

With the lid 80 closed, the switch pressers 98, 100 are held in vertical alignment with the direction buttons 84 and the decision button 86, respectively. Therefore, while the lid 80 is being closed over the housing 82, when the direction buttons 84 and the decision button 86 are pressed from above into the upper surface of the lid 80, the direction buttons 84 and the decision button 86 cause the pressing elements of the corresponding switch pressers 98, 100 to press corresponding pressure switches in the housing 82.

As shown in FIG. 5, power and signal terminals 102 are mounted on the board 94 and disposed in the window of the connector 96. The connector 96 has a shape and dimensions that are identical to those of ordinary memory cards for use with the entertainment apparatus 32.

Circuit arrangements of the entertainment apparatus 32 and the portable information terminal 18 will be described below with reference to FIGS. 6 and 7.

Figure 6:
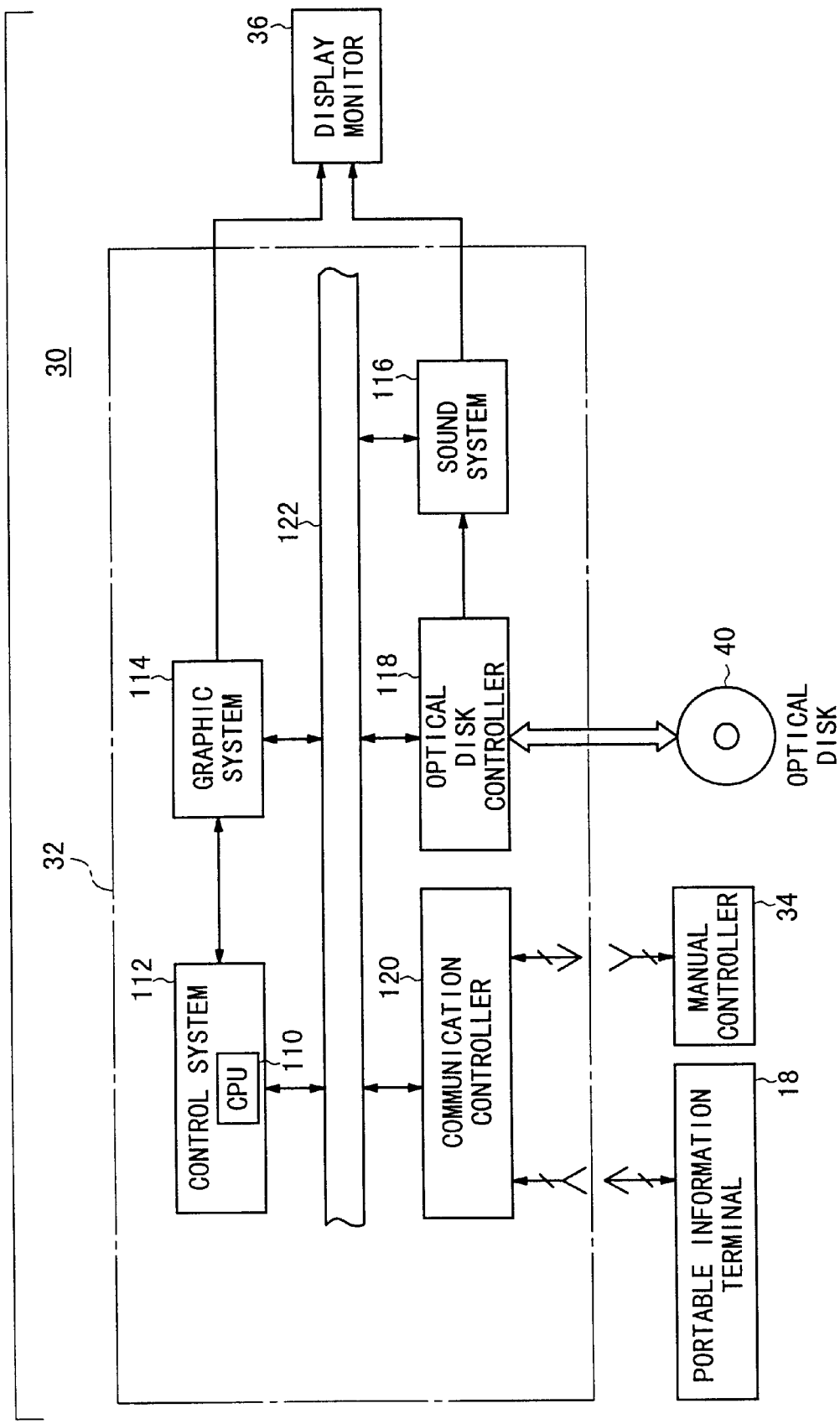
FIG. 6 is a block diagram of a circuit arrangement of an entertainment apparatus.

As shown in FIG. 6, the entertainment apparatus 32 comprises a control system 112 including a central processing unit (CPU) 110 and peripheral devices thereof, a graphic system 114 including a frame buffer and a graphic processing unit (GPU) for rendering image data in the frame buffer, a sound system 116 including a sound processing unit (SPU) for generating music sounds and sound effects, an optical disk controller 118 for controlling the readout of the optical disk 40 in which application programs and data are stored, a communication controller 120 for controlling the inputting of data into and outputting of data from the manual controller 34, the portable information terminal 18, or the memory card (not shown), and a system bus 122 to which the control system 112, the graphic system 114, the sound system 116, the optical disk controller 118, and the communication controller 120 are connected.

Video and audio signals generated by and outputted from the graphic system 114 and the sound system 116 composing the entertainment apparatus 32 are supplied to the display monitor 36 to display images on the display screen of the display monitor 36 and reproduce sounds from the speakers of the display monitor 36.

Figure 7:
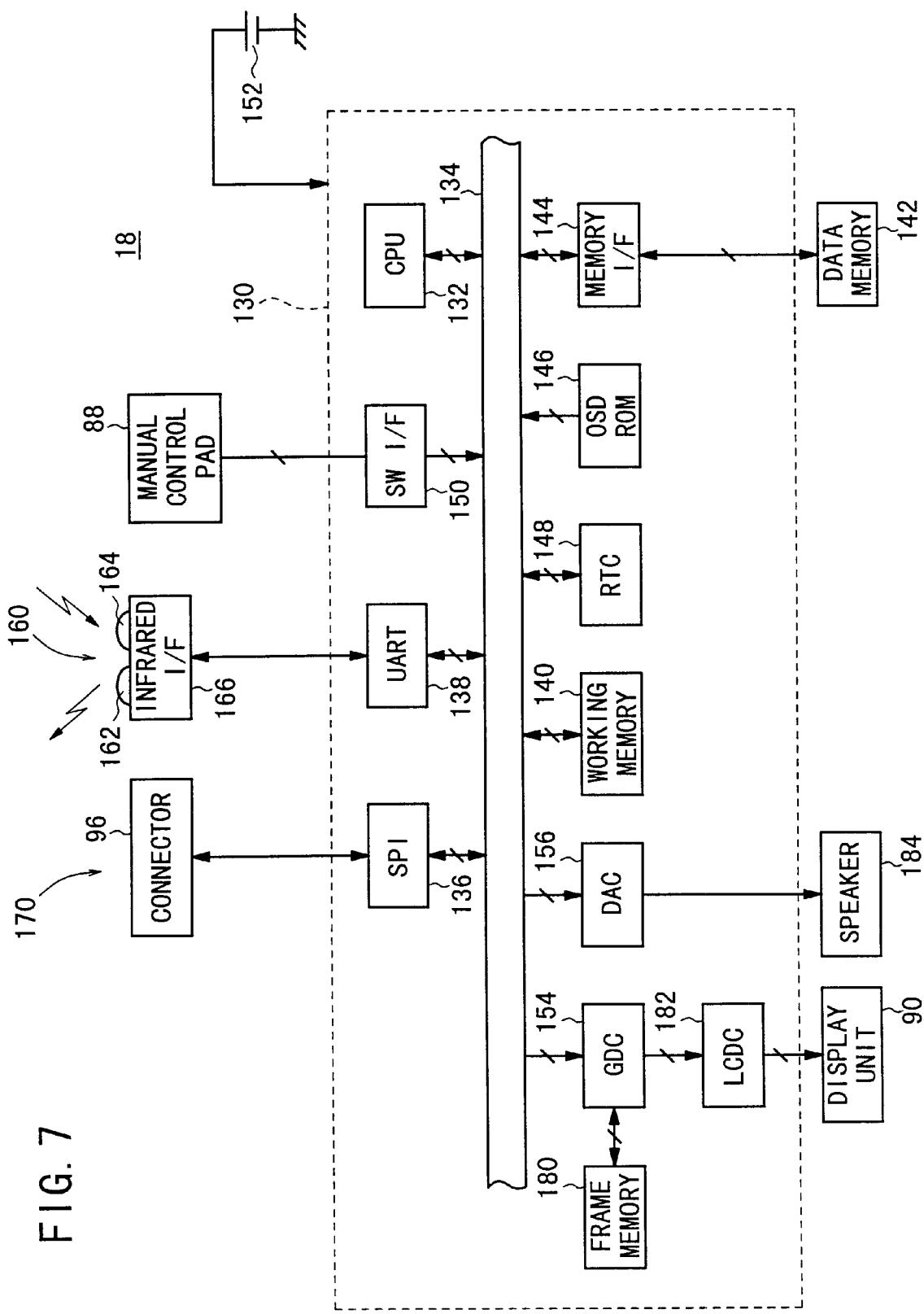
FIG. 7 is a block diagram of a circuit arrangement of the portable information terminal according to the present invention.

As shown in FIG. 7, the portable information terminal 18 has a controller 130 comprising a microcomputer or the like. The controller 130 has a CPU 132 for controlling the entire system of the portable information terminal 18 via a system bus 134.

To the system bus 134 of the controller 130, there are connected, in addition to the CPU 132, a serial-parallel interface (SPI) 136 for communication with the entertainment apparatus 32, and a UART (Universal Asynchronous Receiver Transmitter) 138 which is an interface for asynchronous data transfer.

To the system bus 134 of the controller 130, there are also connected a working memory 140 comprising an SRAM for temporarily storing data and processed results required for processing by the CPU 132, and a data memory (data storage memory) 142 as an external storage means via a memory interface 144.

To the system bus 134, there are also connected a ROM (OSDROM) 146 comprising a flash memory and having an OSD (On Screen Display) function, and a real-time clock (RTC) 148 having a calendar and clock function. The OSDROM 146 stores a control program such as kernel.

The manual control pad 88 is connected to the system bus 134 via a switch interface (SWIF) 150 which also functions as an interrupt generating means.

The system bus 134 of the controller 130 is supplied with electric energy from a battery 152. When the portable information terminal 18 is disconnected from, i.e., independent of, the entertainment apparatus 32, the portable information terminal 18 can execute application software stored in the data memory 142. The contents of the data memory 142 are backed up by its nonvolatile memory capability even when the power supply of the portable information terminal 18 is turned off.

To the system bus 134, there are also connected a GDC (Graphic Display Controller) 154 as an image processing means, and a DAC (Digital-to-Analog Converter) 156 for converting a digital signal supplied from the system bus 134 into an analog signal.

The portable information terminal 18 has two communication routes, i.e., a first communication route 160 and a second communication route 170, for receiving data from and outputting data to external devices.

The first communication route 160 comprises an infrared interface 166 which is a module according to IrDA (Infrared Data Association) having an infrared-emitting diode 162 and an infrared-detecting diode 164, and the UART 138. Infrared signals are received from and outputted to external devices via the infrared interface 166, converted from parallel into serial signals or from serial into parallel signals by the UART 138, and supplied to and outputted from the system bus 134.

The second communication route 170 comprises the connector (physical connector) 96 for making a physical connection, and the serial-parallel interface (SPI) 136. As described above, as shown in FIG. 1, the connector 96 is mounted in either one of terminal insertion units (upper slot units 50B, 52B) of the slots 50, 52 of the entertainment apparatus 32, supplies serial data of information from the entertainment apparatus 32, e.g., information read from the optical disk 40 (including application software of a game) to the SPI 136, which converts the serial data into parallel data and supplies the parallel data to the system bus 134 via the connector 96.

An image is displayed on the display screen of the display unit 90 of the portable information terminal 18 as follows: The GDC 154 as the image processing means exchanges data with a frame memory 180 connected thereto, and controls an LCDC (Liquid Crystal Display Controller) 182, which is a controller for the liquid crystal display unit, to display an image on the display screen of the display unit 90.

Sound (including music sound) is outputted from a speaker 184 as a sound outputting means as follows: The DAC 156 for converting a digital signal into an analog signal receives digital sound data from the system bus 134, converts the digital sound data into analog sound data, and supplies the analog sound data to the speaker 184, which radiates corresponding sound.

Software (audio data processing means 200) for achieving a method of processing audio data according to the present invention will be described below with reference to FIGS. 8 through 37. The software which will be described below is by way of example only, and various forms of software can be applied if they can perform the method of processing audio data according to the present invention.

The audio data processing means 200 is recorded in the optical disk 40, and downloaded into the portable information terminal 18 by a downloading program that is run by the entertainment apparatus 32.

Figure 8:
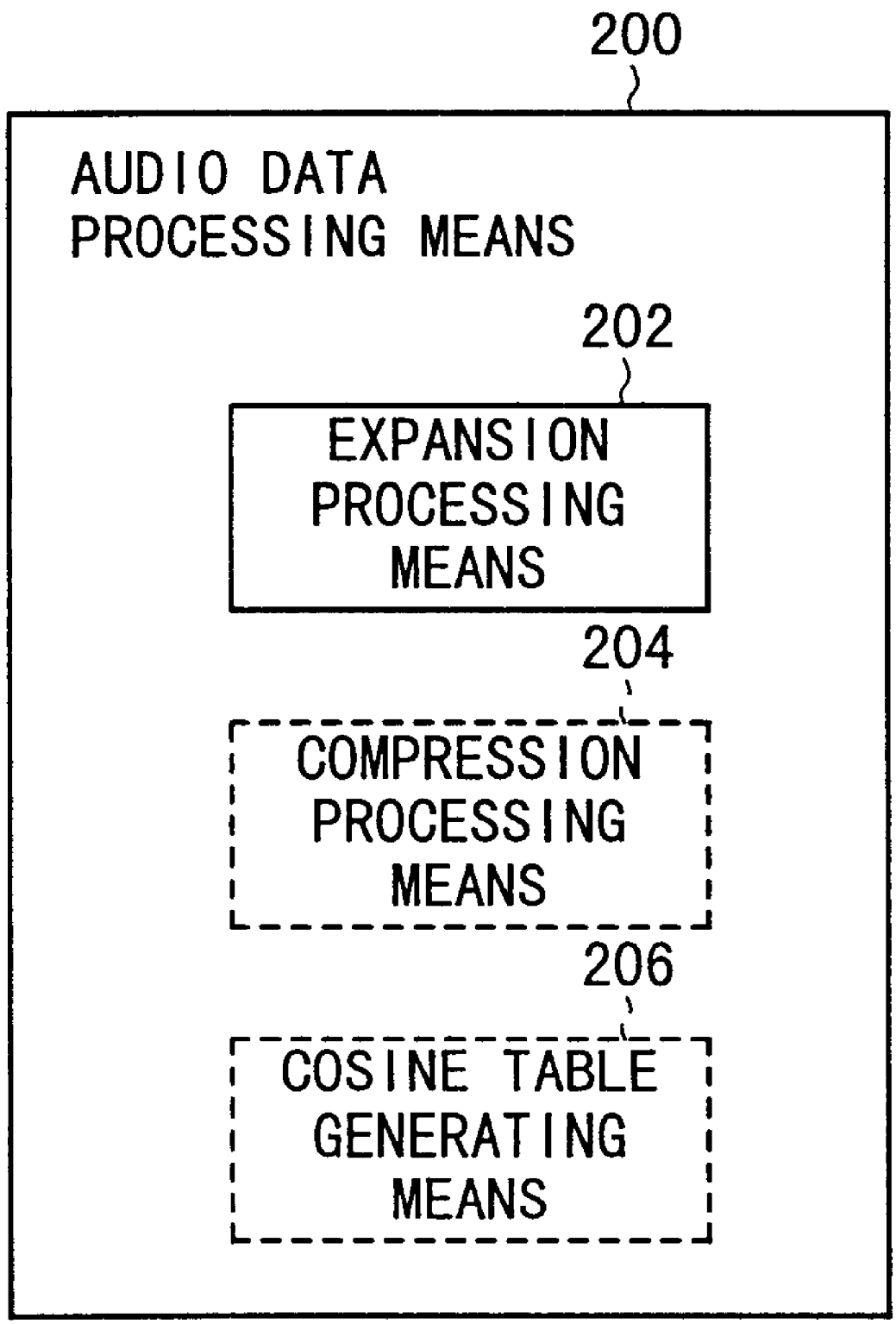
FIG. 8 is a block diagram of an audio data processing means according to the present invention.

As shown in FIG. 8, the audio data processing means 200 has an expansion processing means 202 for expanding compressed data, on which variable-length coding has not been effected, to restore audio data.

The audio data processing means 200 also has, if necessary, a compression processing means 204 for compressing audio data into compressed data, and a cosine table generating means 206 for generating a cosine table for use by the expansion processing means 202. The compression processing means 204 and the cosine table generating means 206 are not transferred to the portable information terminal 18, but the cosine table is transferred together with the compressed data to the data memory 142 of the portable information terminal 18.

Figure 9:
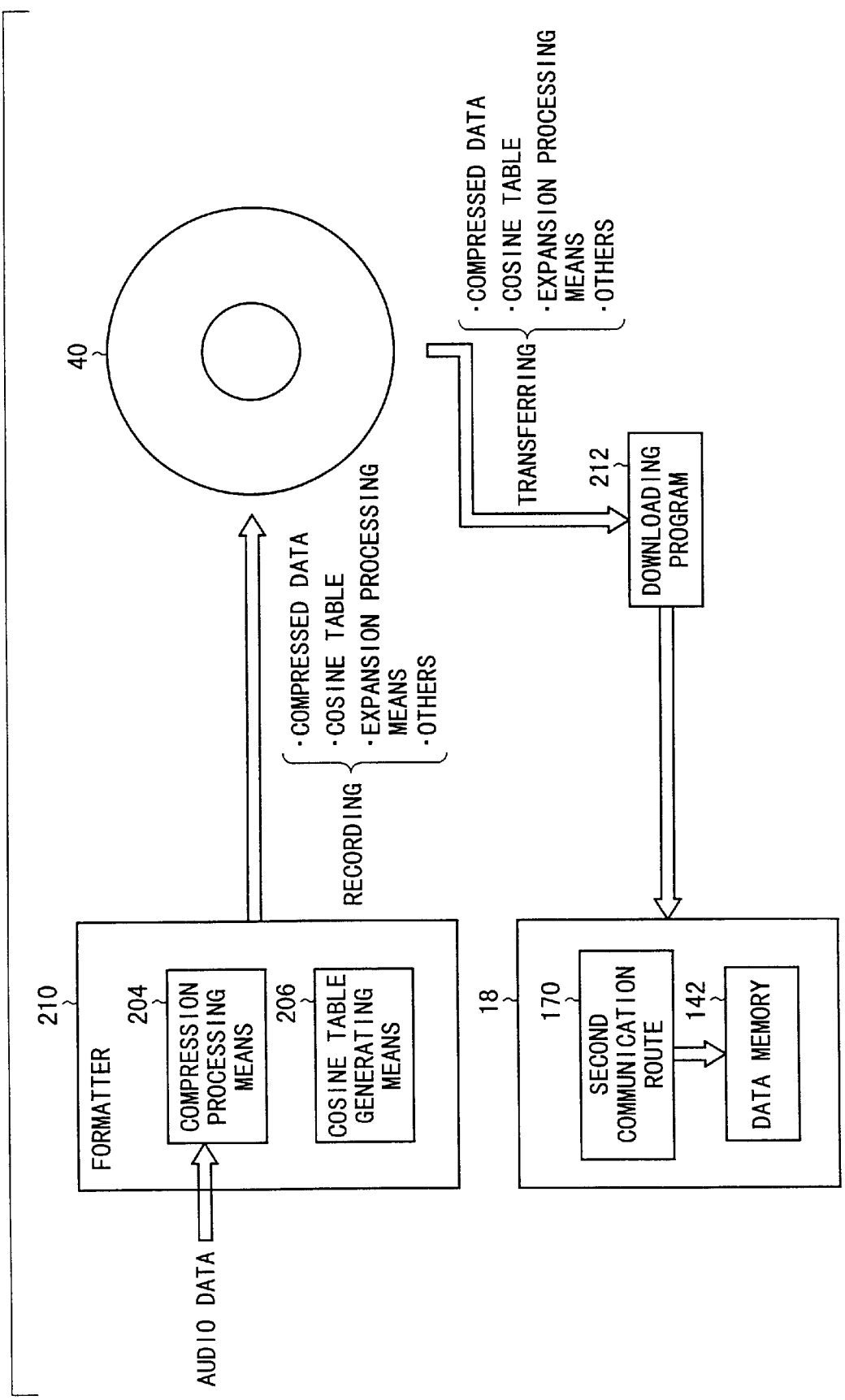
FIG. 9 is a diagram showing the manner in which compressed data recorded in an optical disk is transferred together with various programs and data to the portable information terminal.

As shown in FIG. 9, the compressed data comprises, for example, compressed data recorded in the optical disk 40, and is read into the data memory 142 of the portable information terminal 18 via the second communication route 170 thereof. The compressed data represents audio data that is compressed by a compression processing means 204 that is incorporated in a formatter 210, i.e., a device for writing data in the optical disk 40.

Specifically, mainly an audio data flow will be described below with reference to FIG. 9. The audio data is compressed by the compression processing means 204 that operates on the formatter 210, and the compressed data is recorded in the optical disk 40. At the same time, a cosine table is generated by a cosine table generating means 206 that operates on the formatter 210, and recorded in the optical disk 40.

The expansion processing means 202, other programs, and data are also recorded in the optical disk 40 by the formatter 210.

The expansion processing means 202, the compressed data, the cosine table, the other programs, and the data which have been recorded in the optical disk 40 are transferred to the portable information terminal 18 by a downloading program 212 that is run by the entertainment apparatus 32, and stored in the data memory 142 or the like via the second communication route 170.

Figure 10:
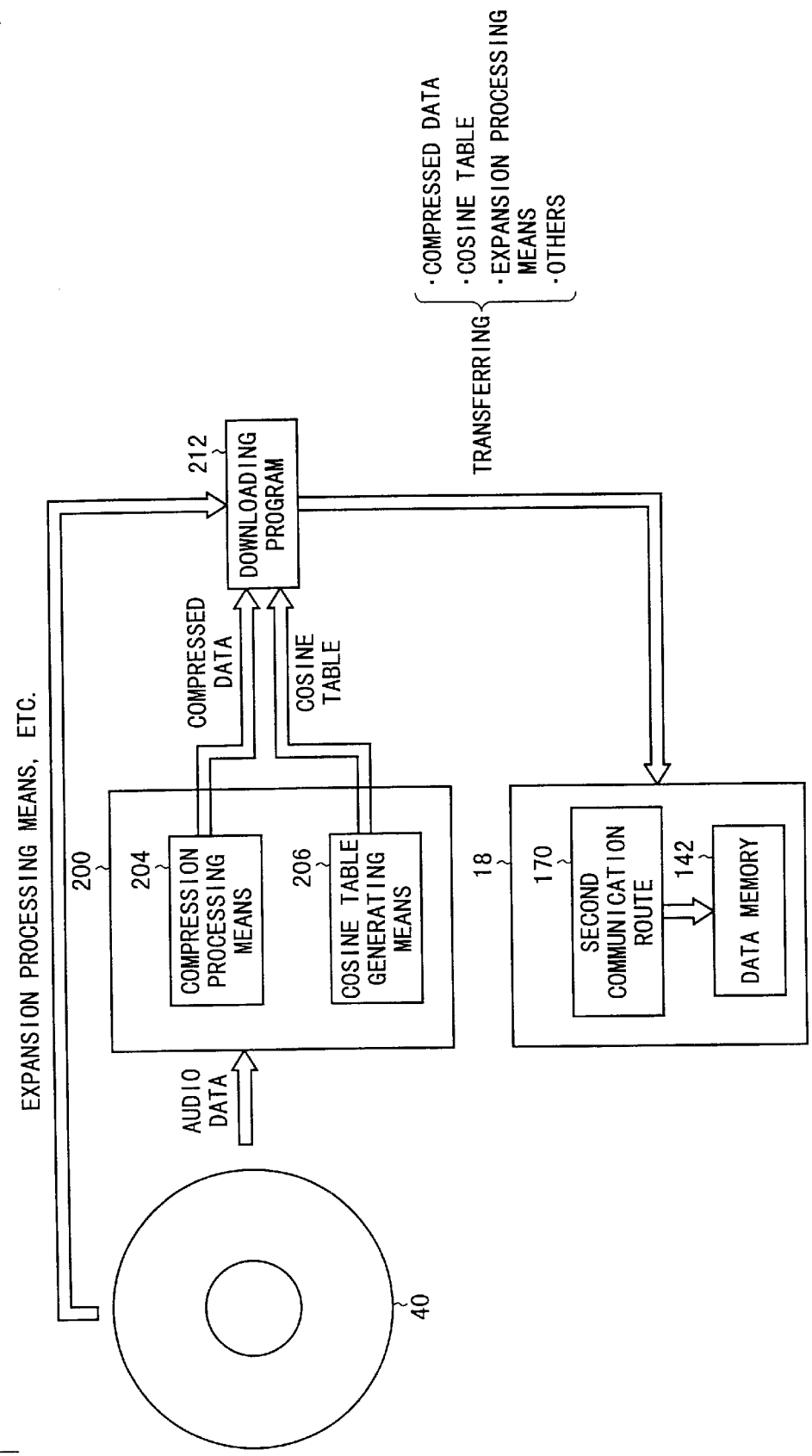
FIG. 10 is a diagram showing the manner in which audio data recorded in an optical disk is compressed by a compression processing means, and the compressed data is transferred together with various programs and data to the portable information terminal.

As shown in FIG. 10, if audio data is recorded as PCM data rather than compressed data in the optical disk 40, then the audio data is compressed by the compression processing means 204 included in the audio data processing means 200, and the compressed data is read into the data memory 142 of the portable information terminal 18 via the second communication route 170 thereof.

Specifically, mainly an audio data flow will be described below with reference to FIG. 10. The audio data is compressed by the compression processing means 204 that operates on the entertainment apparatus 32, and at the same time, a cosine table is generated by the cosine table generating means 206 that operates on the entertainment apparatus 32. The compressed data and the cosine table are transferred to the portable information terminal 18 by the downloading program 212 that is run by the entertainment apparatus 32.

The expansion processing means 202, the other programs, and the data are recorded in the optical disk 40, and transferred to the portable information terminal 18 by the downloading program 212.

Figure 11:
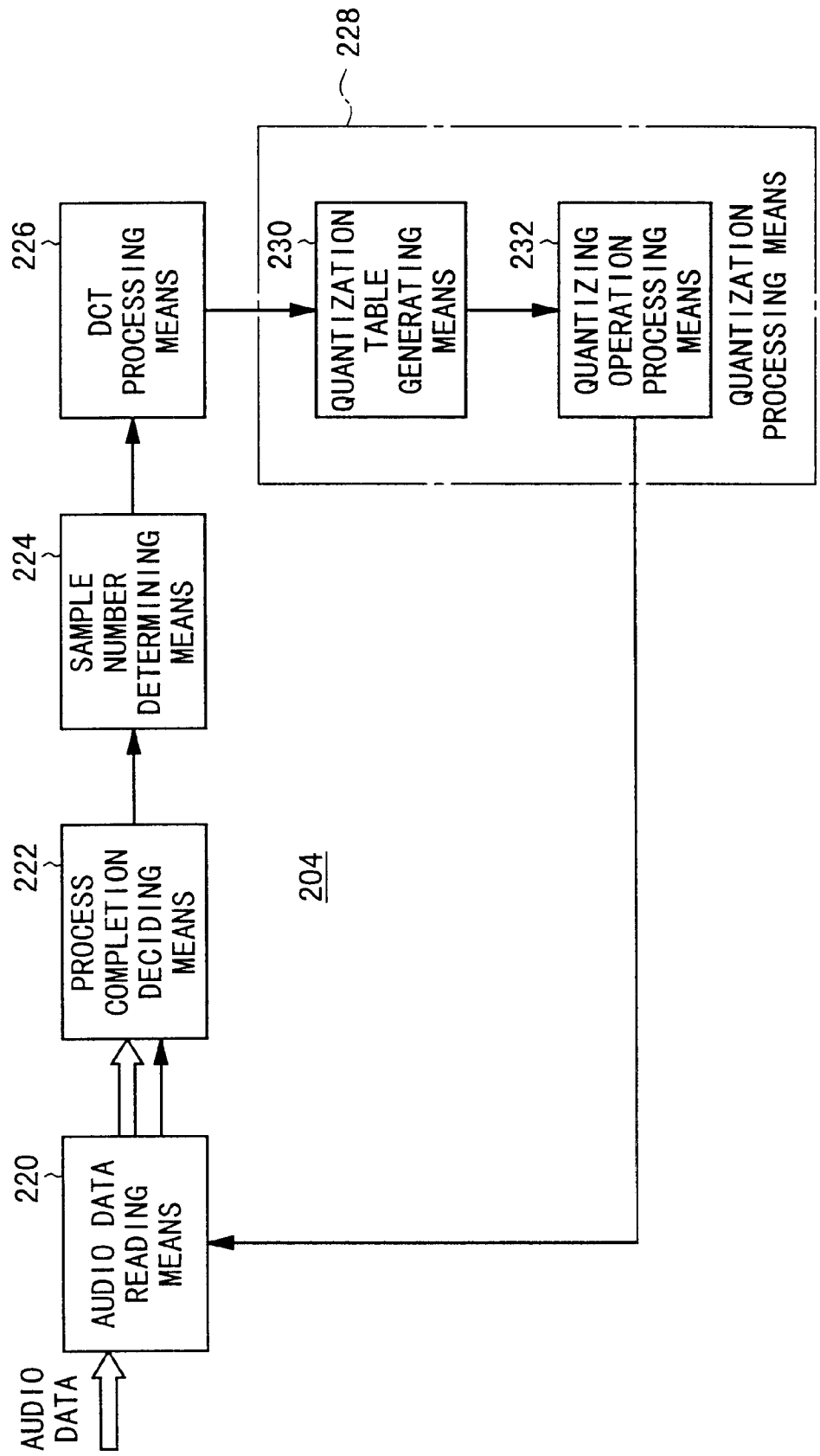
FIG. 11 is a functional block diagram of the compression processing means.

The compression processing means 204 will be described below with reference to FIG. 11. As shown in FIG. 11, the compression processing means 204 comprises an audio data reading means 220 for successively reading audio data to be compressed, a process completion deciding means 222 for deciding the completion of a compressing process, a sample number determining means 224 for determining the number C of samples from the data length of the read audio data, a DCT processing means 226 for effecting a DCT (Discrete Cosine Transform) process on the read audio data to convert the audio data from a time domain to audio data in a frequency domain, and a quantization processing means 228 for quantizing the DCT-processed data outputted by the DCT processing means 226.

The quantization processing means 228 comprises a quantization table generating means 230 for determining maximum values at respective frequencies of the DCT-processed data to generate a quantization table containing the maximum values at the respective frequencies, and a quantizing operation processing means 232 for dividing the DCT-processed data by the maximum values at the respective frequencies in the quantization table to produce quantized data.

A processing sequence of the compression processing means 204 will be described below with reference to flowcharts of FIGS. 12 through 20.

Figure 12:
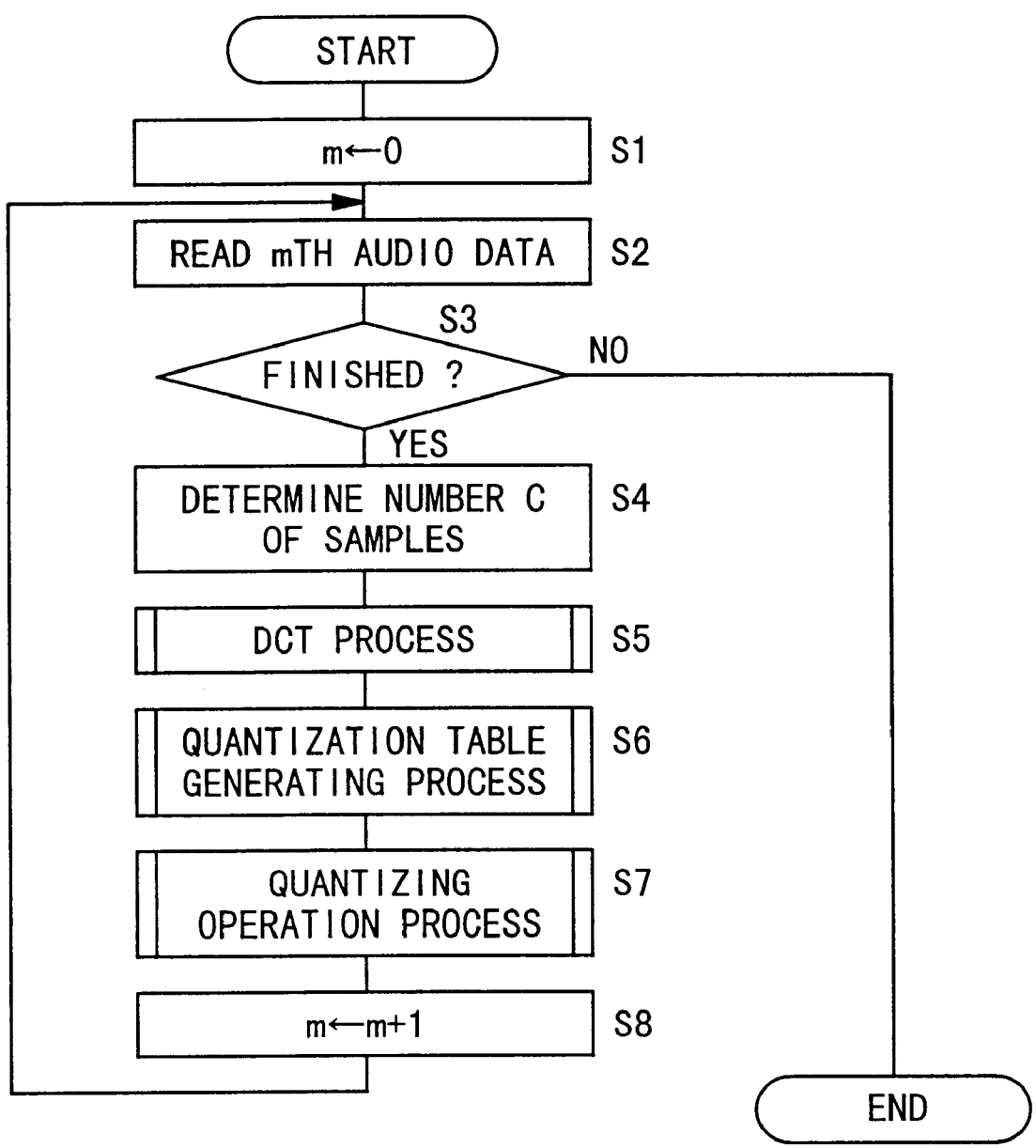
FIG. 12 is a flowchart of a processing sequence of the compression processing means.

In step S1 shown in FIG. 12, the compression processing means 204 stores an initial value "0" in an index register m used for retrieving audio data, thus initializing the index register m.

In step S2, the audio data reading means 220 reads mth audio data.

In step S3, the process completion deciding means 222 decides whether the compression of all audio data has been finished or not by deciding whether the read audio data is EOD, i.e., an end of data, or not.

If the compressing process has not been finished, then control goes to step S4 in which the sample number determining means 224 determines the number C of samples of the present audio data based on the data length of the read audio data.

In step S5, the DCT processing means 226 effects a DCT process on the present audio data.

The DCT process is carried according to the following equation (1):

$$F_k(i) = \sqrt{\frac{2}{A}} \, C(i) \sum_{j=0}^{A-1} X_k(j) \cos\left[\frac{(2j+1)i\pi}{2A}\right] \quad (1)$$

where $$C(i) \begin{cases} = \dfrac{1}{\sqrt{2}} & i = 0 \\ = 1 & i \neq 0 \end{cases}$$

The processing sequence of the DCT processing means 226 will be described below with reference to FIGS. 13 and 14. The DCT processing means 226 employs a PCM data file and a DCT data file.

As shown in FIG. 15, the PCM data file contains samples each comprising a predetermined number of blocks each storing audio data (PCM data). In the present embodiment, the number A of blocks of one sample is 8.

Figure 16:
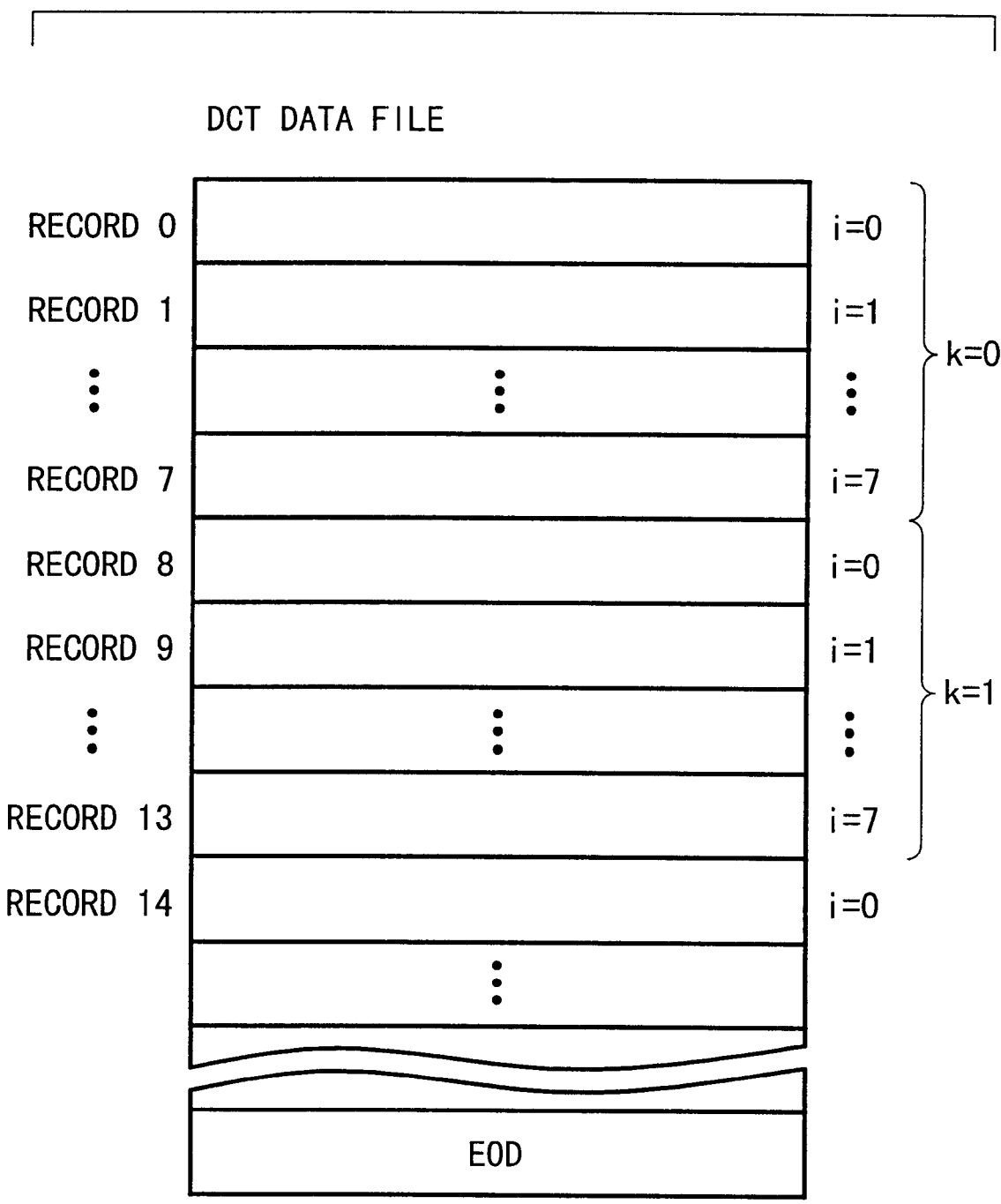
FIG. 16 is a diagram showing details of a DCT data file.

As shown in FIG. 16, the DCT data file contains samples each comprising a predetermined number of records each storing DCT-processed data. In the present embodiment, the number B of records of one sample is 8.

Figure 13:
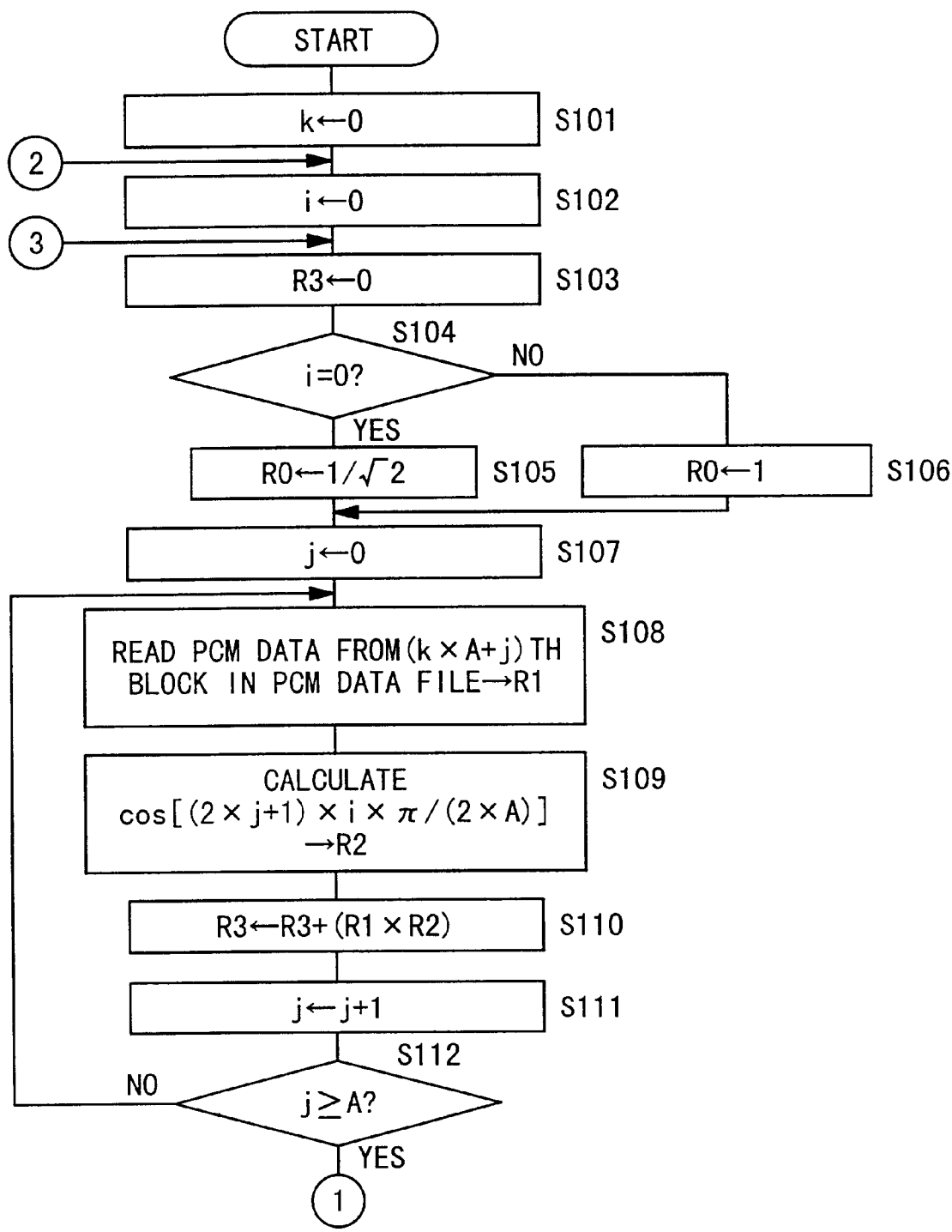
FIGS. 13 and 14 are a flowchart of a processing sequence of a DCT processing means.
Figure 14:
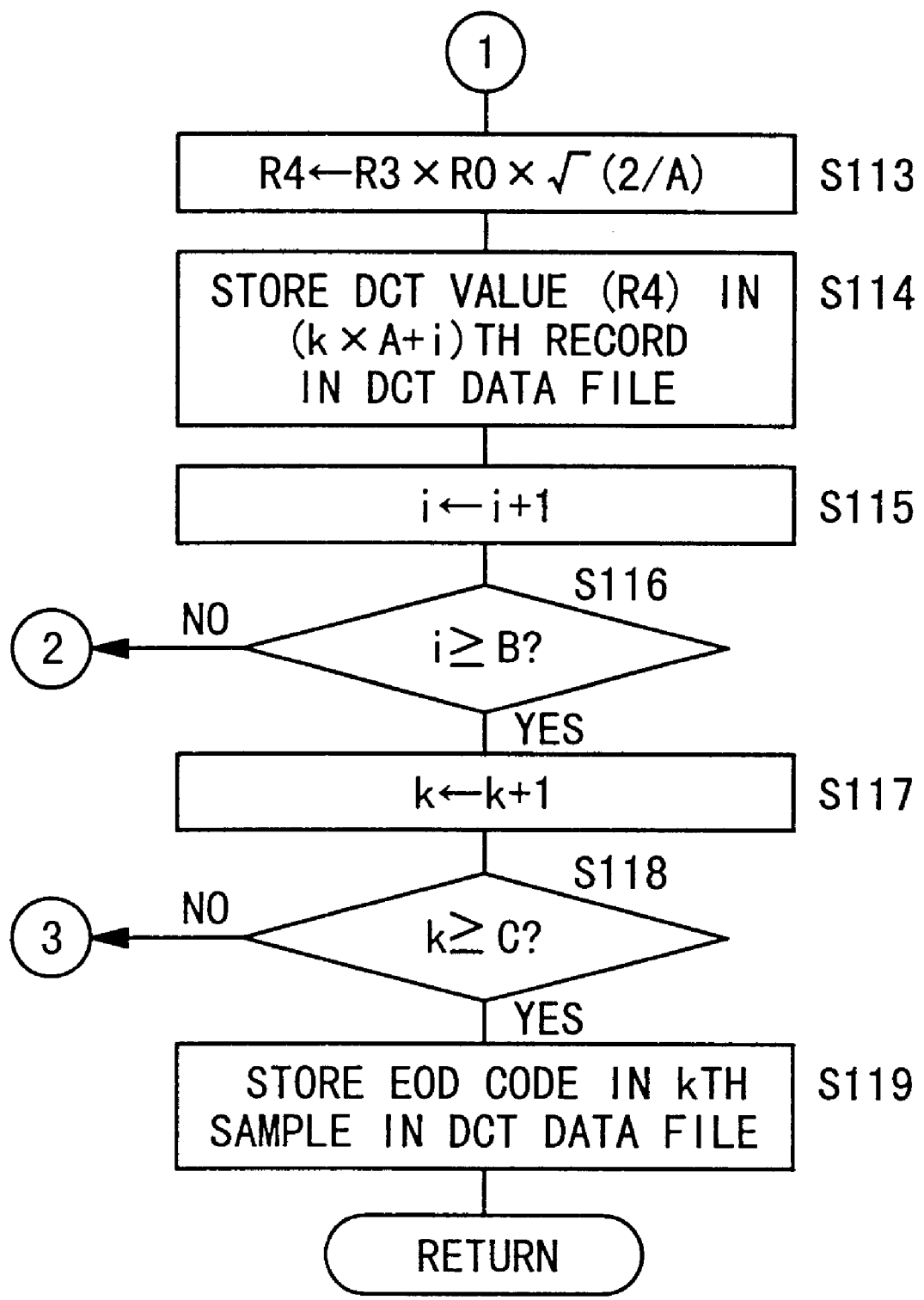

In step S101 shown in FIG. 13, the DCT processing means 226 stores an initial value "0" in an index register k used for updating samples, thus initializing the index register k.

In step S102, the DCT processing means 226 stores an initial value "0" in an index register i used for retrieving records in the DCT data file, thus initializing the index register i.

In step S103, the DCT processing means 226 stores an initial value "0" in an accumulating register R3, thus initializing the accumulating register R3.

In steps S104 through S106, the DCT processing means 226 determines C(i) in the equation (1) above. Specifically, in step S104, the DCT processing means 226 decides the value of the index register i. If i=0, then the DCT processing means 226 stores $1/\sqrt{2}$ in a register R0 in step S105. If i is other than 0, then the DCT processing means 226 stores "1" in the register R0 in step S106.

In step S107, the DCT processing means 226 stores an initial value "0" in an index register j used for retrieving blocks, thus initializing the index register j.

In step S108, the DCT processing means 226 reads PCM data from a (k×A+j)th block in the PCM data file, and stores the read PCM data in a register R1.

Then, in step S109, the DCT processing means 226 calculates:

$$\cos[(2 \times j + 1) \times i \times \pi /(2 \times A)]$$

in the equation (1), and stores the result in a register R2.

In step S110, the DCT processing means 226 multiplies the present PCM data stored in the register R1 by the above cosine term stored in the register R2, and accumulates the result in the accumulating register R3.

In step S111, the DCT processing means 226 increments the value of the index register j by +1. Thereafter, in step S112, the DCT processing means 226 decides whether the process for one sample (kth sample) has been finished or not by deciding whether or not the value of the index register j is equal to or greater than the number A of blocks.

If the process for one sample has not been finished, control returns to step S108 in order for the DCT processing means 226 to process the PCM data of the next block. If the process for one sample has been finished, then control proceeds to step S113 shown in FIG. 14 in which the DCT processing means 226 calculates the equation (1) for the kth sample. Specifically, the DCT processing means 226 multiplies the value of the accumulating register R3 by the value of the register R0 and $\sqrt{(2/A)}$, and stores the result in a register R4.

In step S114, the DCT processing means 226 stores the DCT value from the register R4 in a (k×A+i)th block in the DCT data file.

In step S115, the DCT processing means 226 increments the value of the index register i by +1. Thereafter, in step S116, the DCT processing means 226 decides whether the process for all frequency ranges for one sample (kth sample) has been finished or not by deciding whether or not the value of the index register i is equal to or greater than the number B of records of the frequency ranges.

If the process for all frequency ranges has not been finished, then control returns to step S103 in order for the DCT processing means 226 to effect the processing for the next frequency range. If the process for all frequency ranges has been finished, then control proceeds to step S117 in which the DCT processing means 226 increments the value of the index register k by +1. In step S118, the DCT processing means 226 decides whether the process for all samples has been finished or not by deciding whether or not the value of the index register k is equal to or greater than the number C of samples.

If the process for all samples has not been finished, then control returns to step S101 in order for the DCT processing means 226 to perform the processing on the next sample. If the process for all samples has been finished, then control proceeds to step S119 in which the DCT processing means 226 stores an EOD code indicative of a data end in the kth sample in the DCT data file. The processing performed by the DCT processing means 226 now comes to an end.

Control then returns to the main routine shown in FIG. 12. In step S6, the quantization table generating means 230 performs its processing.

A processing sequence of the quantization table generating means 230 will be described below with reference to FIGS. 17 and 18. The quantization table generating means 230 employs a quantization table. As shown in FIG. 19, the quantization table contains as many records as the number B of records of frequency ranges each storing the maximum DCT-processed value in the corresponding frequency range.

Figure 17:
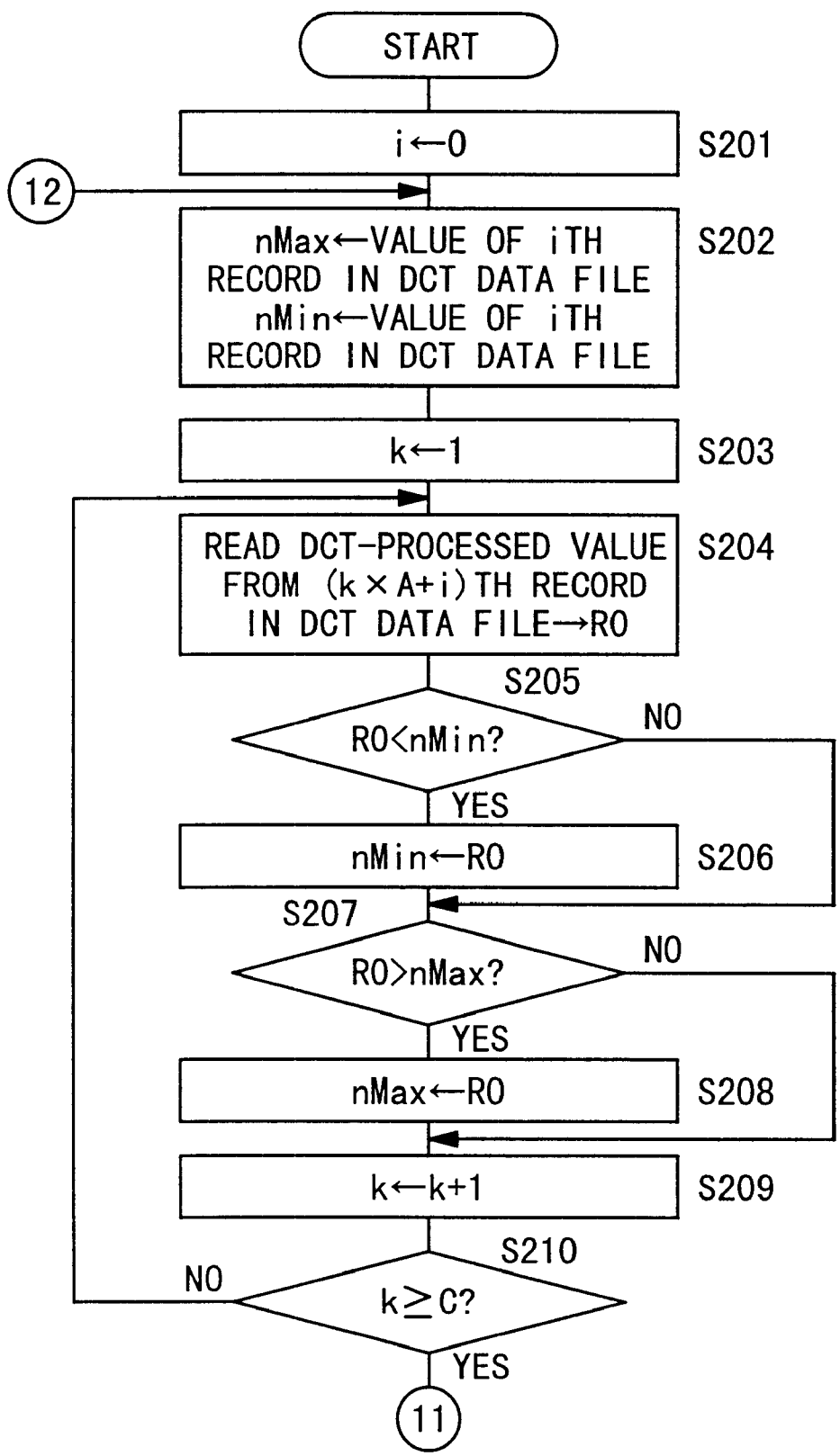
FIGS. 17 and 18 are a flowchart of a processing sequence of a quantization table generating means.
Figure 18:
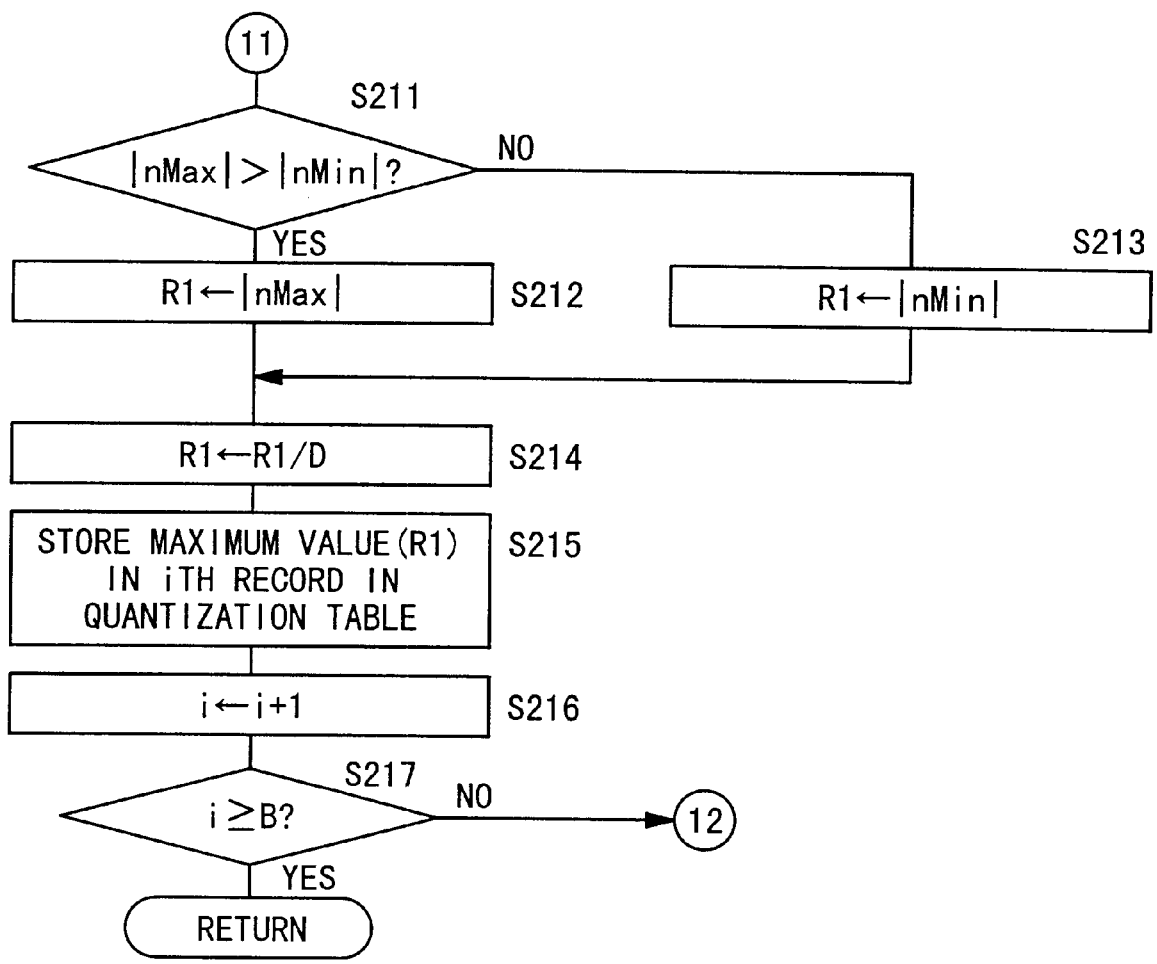

In step S201 shown in FIG. 17, the quantization table generating means 230 stores an initial value "0" in the index register i used for retrieving records in the DCT data file, thus initializing the index register i.

In step S202, the quantization table generating means 230 reads the DCT-processed value from the ith record in the DCT data file, and stores the DCT-processed value in a maximum value register nMax and a minimum value register nMin.

In step S203, the quantization table generating means 230 stores "1" in the index register k used for updating samples. In step S204, the quantization table generating means 230 reads the DCT-processed value from a (k×A+i)th record in the DCT data file, and stores the read DCT-processed value in the register R0.

Then, in step S205, the quantization table generating means 230 decides whether the DCT-processed value stored in the register R0 is a minimum value or not by deciding whether the DCT-processed value stored in the register R0 is smaller than the value stored in the minimum value register nMin. If the DCT-processed value is smaller than the value stored in the minimum value register nMin, then control goes to step S206 in which the quantization table generating means 230 stores the DCT-processed value in the minimum value register nMin.

In step S207, the quantization table generating means 230 decides whether the DCT-processed value stored in the register R0 is a maximum value or not by deciding whether the DCT-processed value stored in the register R0 is greater than the value stored in the maximum value register nMax. If the DCT-processed value is greater than the value stored in the maximum value register nMax, then control goes to step S208 in which the quantization table generating means 230 stores the DCT-processed value in the maximum value register nMax.

In step S209, the quantization table generating means 230 increments the value of the index register k by +1. Thereafter, in step S210, the quantization table generating means 230 decides whether the process has been completed for all samples for an ith frequency range or not.

If the process has not been completed, then control returns to step S204 in order for the quantization table generating means 230 to determine maximum and minimum DCT processed values for the next sample. If the process has been completed, then control goes to step S211 shown in FIG. 18.

In step S211, the quantization table generating means 230 decides whether the absolute value of the maximum value, i.e., the value stored in the maximum value register nMax, is greater than the absolute value of the minimum value, i.e., the value stored in the minimum value register nMin, or not.

If the absolute value of the value stored in the maximum value register nMax is greater than the absolute value of the value stored in the minimum value register nMin, then control goes to step S212 in which the quantization table generating means 230 stores the absolute value of the value stored in the maximum value register nMax in the register R1. Conversely, if the absolute value of the value stored in the maximum value register nMax is smaller than the absolute value of the value stored in the minimum value register nMin, then control goes to step S213 in which the quantization table generating means 230 stores the absolute value of the value stored in the minimum value register nMin in the register R1.

Thereafter, in step S214, the quantization table generating means 230 divides the maximum value stored in the register R1 by a predetermined number D, converting the value into data that can be handled with a predetermined number of bits, and stores the produced data in the register R1. For example, the quantization table generating means 230 divides the maximum value by 16 (=D), converting the value into 4-bit data, for example.

In step S215, the quantization table generating means 230 stores the maximum value from the register R1 in an ith record in the quantization table.

In step S216, the quantization table generating means 230 increments the value of the index register i by +1. Thereafter, in step S217, the quantization table generating means 230 decides whether the process has been completed for all frequency ranges or not.

If the process has not been completed for all frequency ranges, then control returns to step S202 in order for the quantization table generating means 230 to perform its processing on the next frequency range. If the process has been completed for all frequency ranges, then the processing performed by the quantization table generating means 230 now comes to an end.

Control then returns to the main routine shown in FIG. 12. In step S7, the quantizing operation processing means 232 performs its processing.

A processing sequence of the quantizing operation processing means 232 will be described below with reference to FIG. 20.

Figure 20:
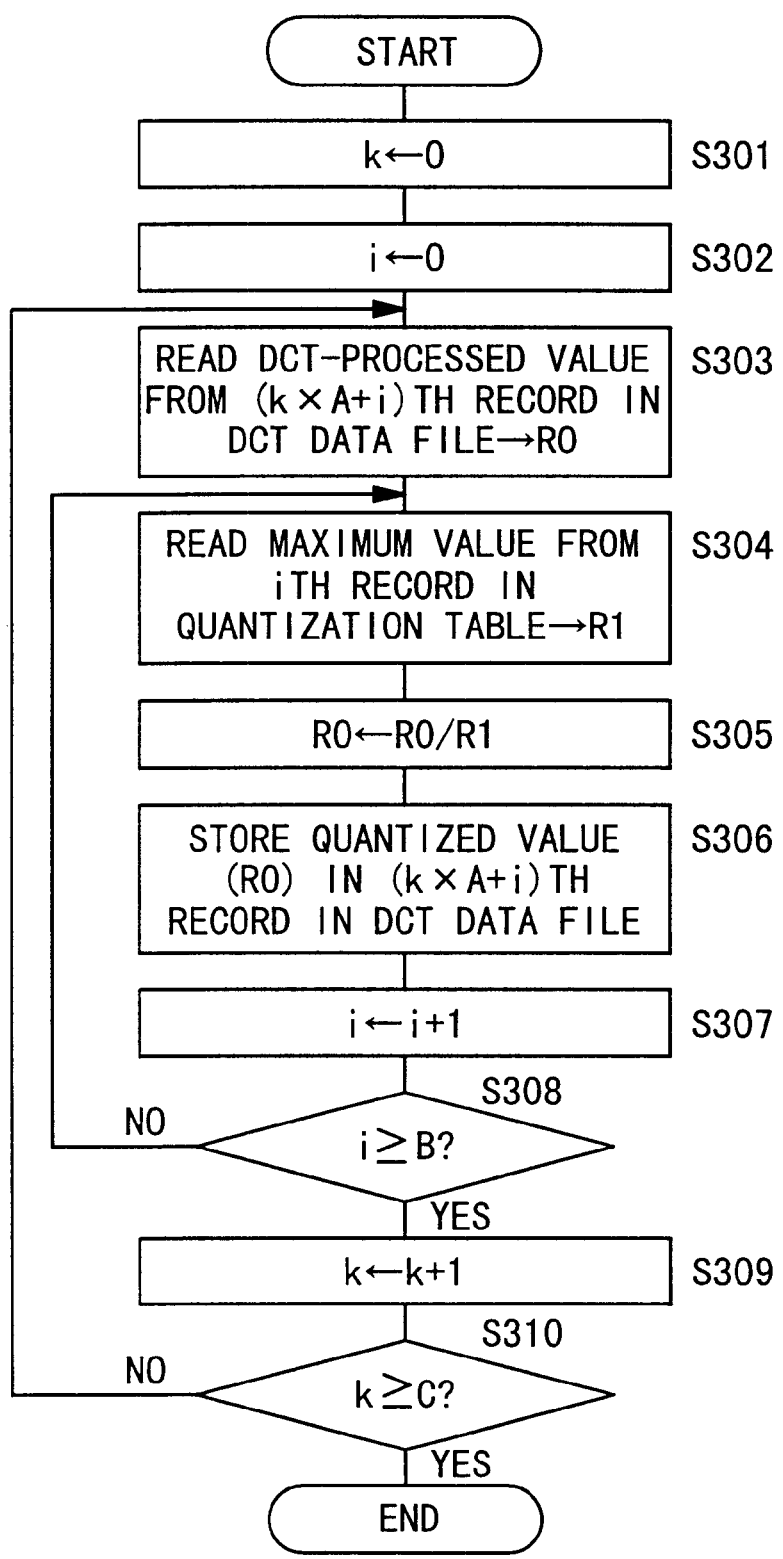
FIG. 20 is a flowchart of a processing sequence of a quantizing operation processing means.

In step S301 shown in FIG. 20, the quantizing operation processing means 232 stores an initial value "0" in the index register k used for updating samples, thus initializing the index register k.

In step S302, the quantizing operation processing means 232 stores an initial value "0" in the index register i used for retrieving records in the DCT data file, thus initializing the index register i.

In step S303, the quantizing operation processing means 232 reads the DCT-processed value from the (k×A+i)th record in the DCT data file, and stores the read DCT-processed value in the register R0. In step S304, the quantizing operation processing means 232 reads the maximum value in the frequency range from the ith record in the quantization table, and stores the read maximum value in the register R1.

In step S305, the quantizing operation processing means 232 quantizes the present DCT-processed value. Specifically, the quantizing operation processing means 232 divides the DCT-processed value in the register R0 by the maximum value in the register R1, and stores the result in the register R0.

In step S306, the quantizing operation processing means 232 stores the quantized value from the register R0 in the (k×A+i)th record in the DCT data file.

In step S307, the quantizing operation processing means 232 increments the value of the index register i by +1. In step S308, the quantizing operation processing means 232 decides whether the process for all frequency ranges has been finished or not.

If the process for all frequency ranges has not been finished, then control returns to step S303 in order for the quantizing operation processing means 232 to perform the quantizing process for the next frequency range. If the process for all frequency ranges has been finished, then control proceeds to step S309 in which the quantizing operation processing means 232 increments the value of the index register k by +1. In step S310, the quantizing operation processing means 232 decides whether the process for all samples has been finished or not.

If the process for all samples has not been finished, then control returns to step S302 in order for the quantizing operation processing means 232 to perform its processing for the next sample. If the process for all samples has been finished, then processing performed by the quantizing operation processing means 232 now comes to an end.

Control then returns to the main routine shown in FIG. 12. In step S8, the compression processing means 204 increments the value of the index register m by +1. Then, control returns to step S2 in which next audio data is read. The read audio data is then subjected to the DCT process and the quantization process.

In step S3, if the read audio data is EOD and hence the compression of all the audio data is decided as being finished, then the processing sequence of the compression processing means 204 is ended.

According to the above compressing process, several types of audio data are recorded as compressed data in the optical disk 40. The compressed data is transferred via the second communication route 170 of the portable information terminal 18 and stored in the data memory 142 of the portable information terminal 18.

Alternatively, the audio data recorded in the optical disk 40 is compressed by the compression processing means 204 in the audio data processing means 200, and the compressed data is stored in the data memory 142 of the portable information terminal 18.

A cosine table used in an expansion process, described later on, is recorded in the optical disk 40. The cosine table is transferred via the second communication route 170 of the portable information terminal 18 and stored in the data memory 142 of the portable information terminal 18.

The expansion process is carried according to the following equation (2):

$$X_k(j) = \sqrt{\frac{2}{A}} C(i) F_k(i) \cos\left[\frac{(2j+1)i\pi}{2A}\right] \quad (2)$$

where $$C(i) \begin{cases} = \dfrac{1}{\sqrt{2}} & i = 0 \\ = 1 & i \neq 0 \end{cases}$$

The cosine table is generated by the cosine table generating means 206 included in the audio data processing means 200.

A processing sequence of the cosine table generating means 206 will be described below with reference to FIG. 21.

Figure 21:
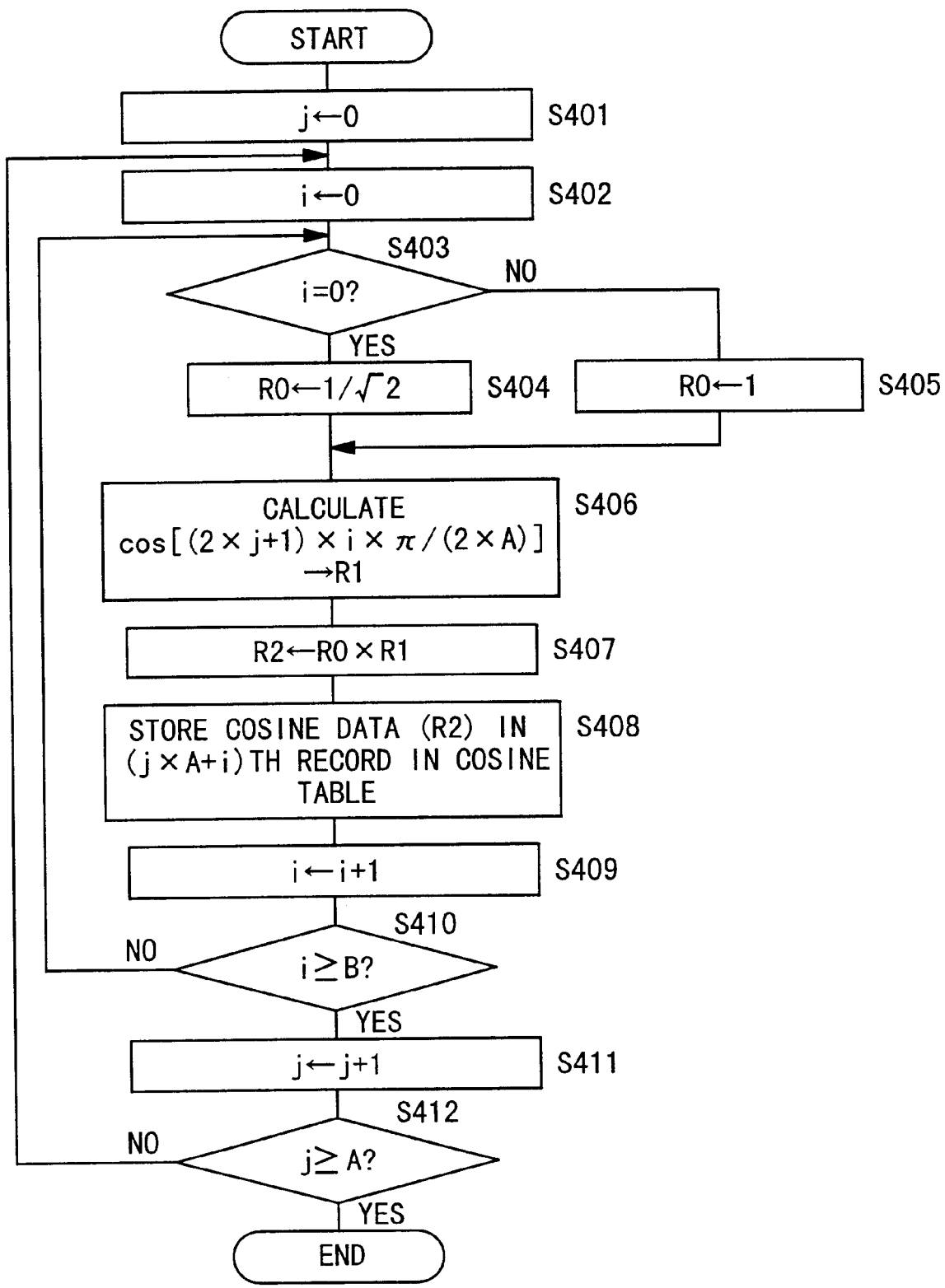
FIG. 21 is a flowchart of a processing sequence of a cosine table generating means.

In step S401 shown in FIG. 21, the cosine table generating means 206 stores an initial value "0" in the index register j used for retrieving blocks, thus initializing the index register j.

In step S402, the cosine table generating means 206 stores an initial value "0" in the index register i used for retrieving records in the DCT data file, thus initializing the index register i.

In steps S403 through S405, the cosine table generating means 206 determines C(i) in the equation (2) above. Specifically, in step S403, the cosine table generating means 206 decides the value of the index register i. If i=0, then the cosine table generating means 206 stores 1/√2 in the register R0 in step S404. If i is other than 0, then the cosine table generating means 206 stores "1" in the register R0 in step S405.

Then, in step S406, the cosine table generating means 206 calculates:

$$\cos[(2\times j+1)\times i\times\pi/(2\times A)]$$

in the equation (2), and stores the result in the register R1.

In step S407, the cosine table generating means 206 multiplies the value of the register R0 by the calculated result of the cosine term stored in the register R1, and stores the result in the register R2.

In step S408, the cosine table generating means 206 stores the cosine data in the register R2 in the (j×A+1)th record in the cosine table.

In step S409, the cosine table generating means 206 increments the value of the index register i by +1. In step S410, the cosine table generating means 206 decides whether the process for all frequency ranges has been finished or not.

If the process for all frequency ranges has not been finished, then control returns to step S403 in order for the cosine table generating means 206 to perform the cosine calculating process for the next frequency range. If the process for all frequency ranges has been finished, then control proceeds to step S411 in which the cosine table generating means 206 increments the value of the index register j by +1. In step S412, the cosine table generating means 206 decides whether the process for all blocks has been finished or not.

If the process for all blocks has not been finished, then control returns to step S402 in order for the cosine table generating means 206 to perform its processing for the next block. If the process for all blocks has been finished, then processing performed by the cosine table generating means 206 now comes to an end.

The expansion processing means 202 operating on the portable information terminal 18 will be described below with reference to FIGS. 22 through 29B.

Figure 22:
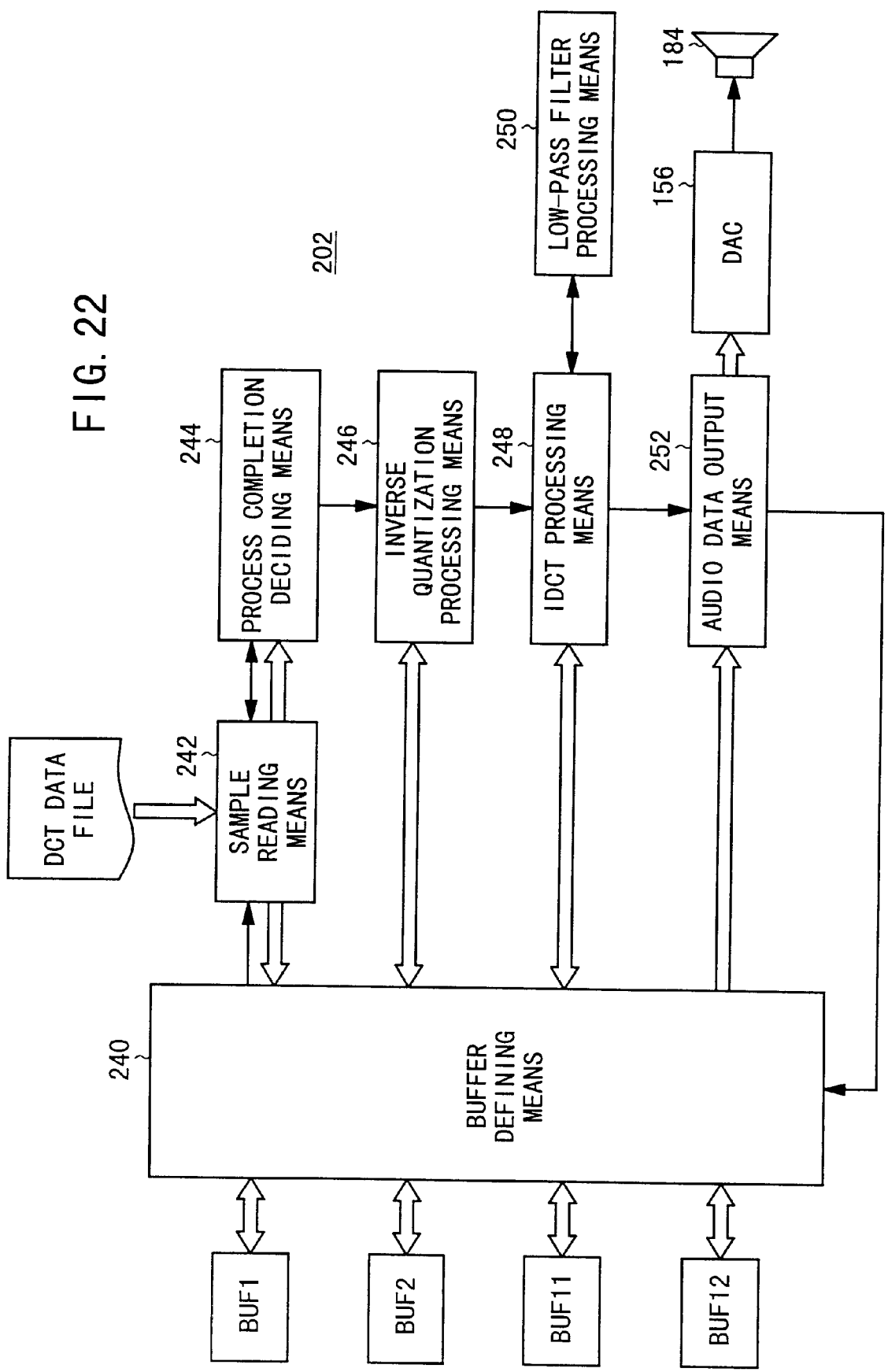
FIG. 22 is a functional block diagram of an expansion processing means.

As shown in FIG. 22, the expansion processing means 202 comprises a buffer defining means 240 for defining one of two buffers BUF1, BUF2 which is to be used as a present inverse quantization buffer and defining one of two buffers BUF11, BUF12 which is to be used as a present restoration buffer, a sample reading means 242 for reading the quantized value of each sample from the DCT data file, a process completion deciding means 244 for deciding the completion of an expanding process, an inverse quantization processing means 246 for inversely quantizing the read quantized value, an IDCT processing means 248 for effecting an IDCT process on the inversely quantized data to restore time-domain audio data from frequency-domain data, a low-pass filter processing means 250 for removing a high-frequency component from the restored audio data, and an audio data output means 252 for outputting successive restored samples of audio data to the DAC 156 to output sound from the speaker 184.

A processing sequence of the expansion processing means 202 will be described below with reference to FIGS. 23 through 29B.

Figure 23:
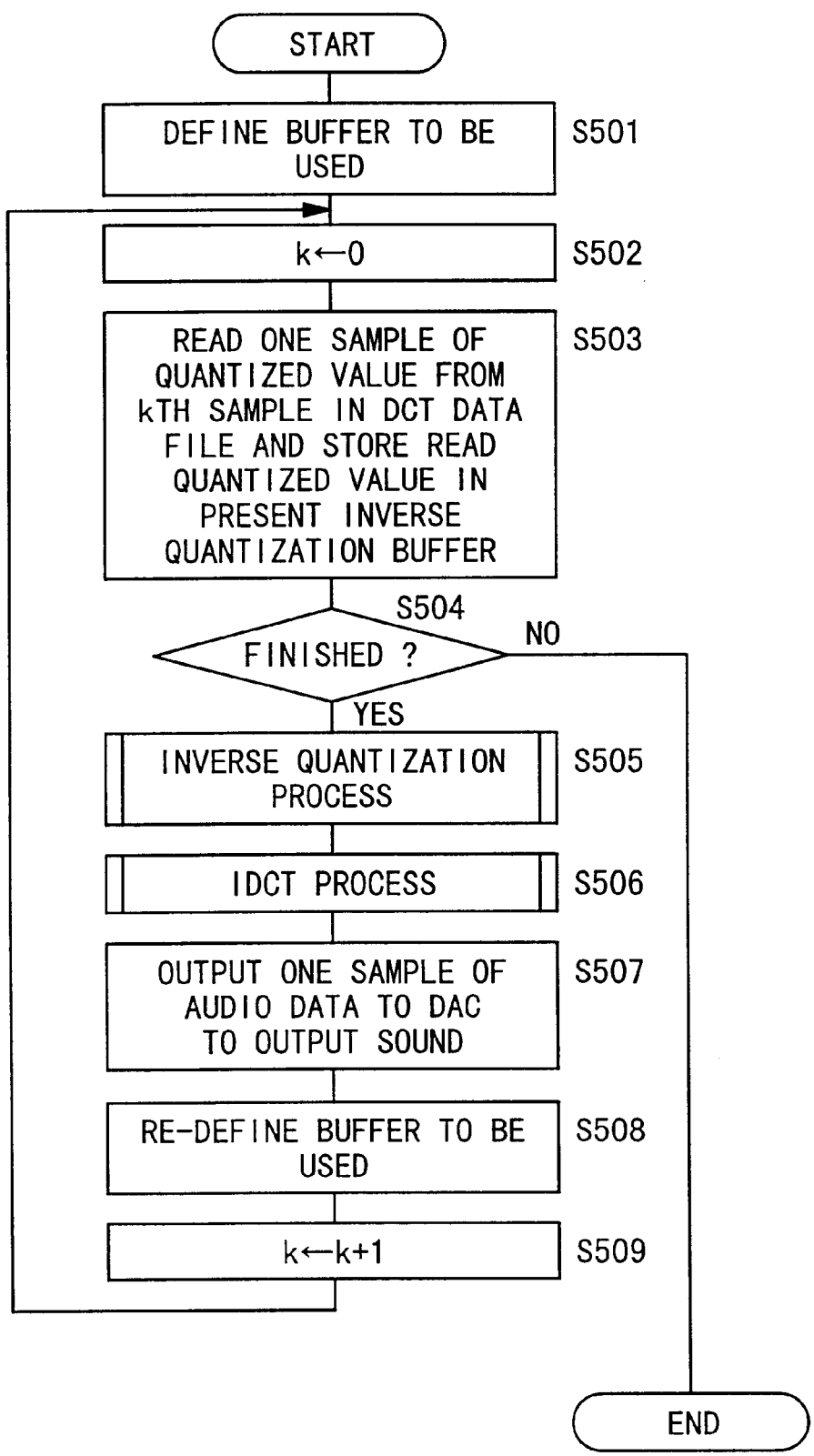
FIG. 23 is a flowchart of a processing sequence of the expansion processing means.

In step S501 shown in FIG. 23, the buffer defining means 240 defines the buffer BUF1 as a present inverse quantization buffer and also defines the buffer BUF11 as a present restoration buffer.

In step S502, the expansion processing means 202 stores an initial value "0" in the index register k used for updating samples, thus initializing the index register k.

In step S503, the sample reading means 242 reads the quantized value of one sample from the kth sample in the DCT data file, and writes the read quantized value in the present inverse quantization buffer.

In step S504, the process completion deciding means 244 decides whether the expansion of all quantized values has been finished or not by deciding whether the read quantized value is EOD, i.e., an end of data, or not.

If the expansion of all quantized values has not been finished, then control proceeds to step S505 in which the inverse quantization processing means 246 effects its processing.

A processing sequence of the inverse quantization processing means 246 will be described below with reference to FIG. 24.

Figure 24:
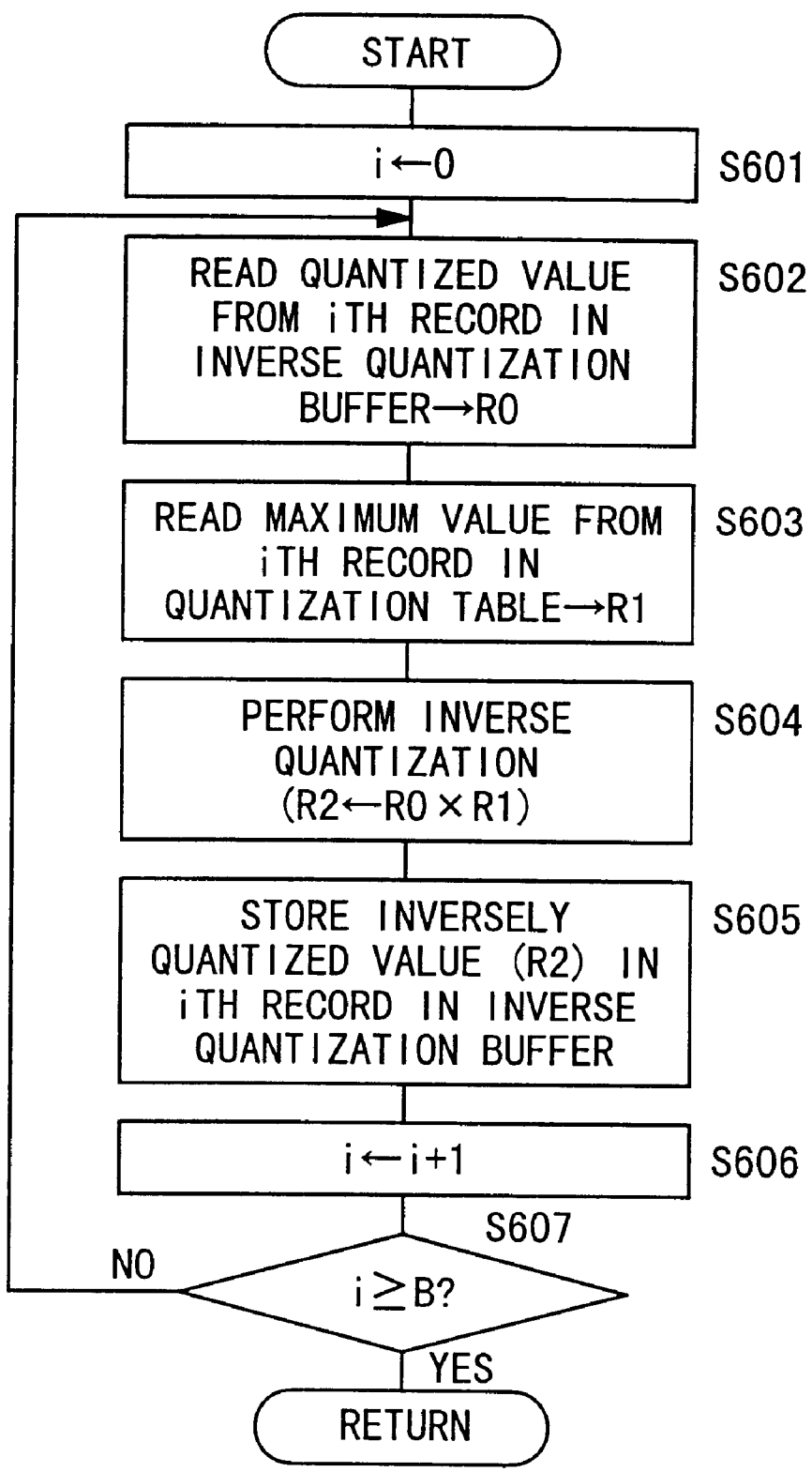
FIG. 24 is a flowchart of a processing sequence of an inverse quantization processing means.

In step S601 shown in FIG. 24, the inverse quantization processing means 246 stores an initial value "0" in an index register i used for retrieving records in the inverse quantization buffer, thus initializing the index register i.

In step S602, the inverse quantization processing means 246 reads the quantized value from an ith record in the inverse quantization buffer, and stores the read quantized value in the register R0. In step S603, the inverse quantization processing means 246 reads the maximum value from an ith record in the quantization table, and stores the read maximum value in the register R1.

In step S604, the inverse quantization processing means 246 performs an inverse quantization process. Specifically, the inverse quantization processing means 246 multiplies the quantized value in the register R0 by the maximum value in the register R1 to determine an inversely quantized value, and stores the inversely quantized value in the register R2.

In step S605, the inverse quantization processing means 246 stores the inversely quantized value from the register R2 in the ith record in the inverse quantization buffer.

In step S606, the inverse quantization processing means 246 increments the value of the index register i by +1. In step S607, the inverse quantization processing means 246 decides whether the inverse quantization process for all frequency ranges for the kth sample has been finished or not.

If the inverse quantization process for all frequency ranges has not been finished, then control returns to step S602 in order for the inverse quantization processing means 246 to perform the inverse quantization process for the next frequency range. If the inverse quantization process for all frequency ranges has been finished, then the processing performed by the inverse quantization processing means 246 comes to an end.

Control then goes back to the main routine shown in FIG. 23. In step S506, the IDCT processing means 248 performs its processing.

A processing sequence of the IDCT processing means 248 will be described below with reference to FIG. 25.

Figure 25:
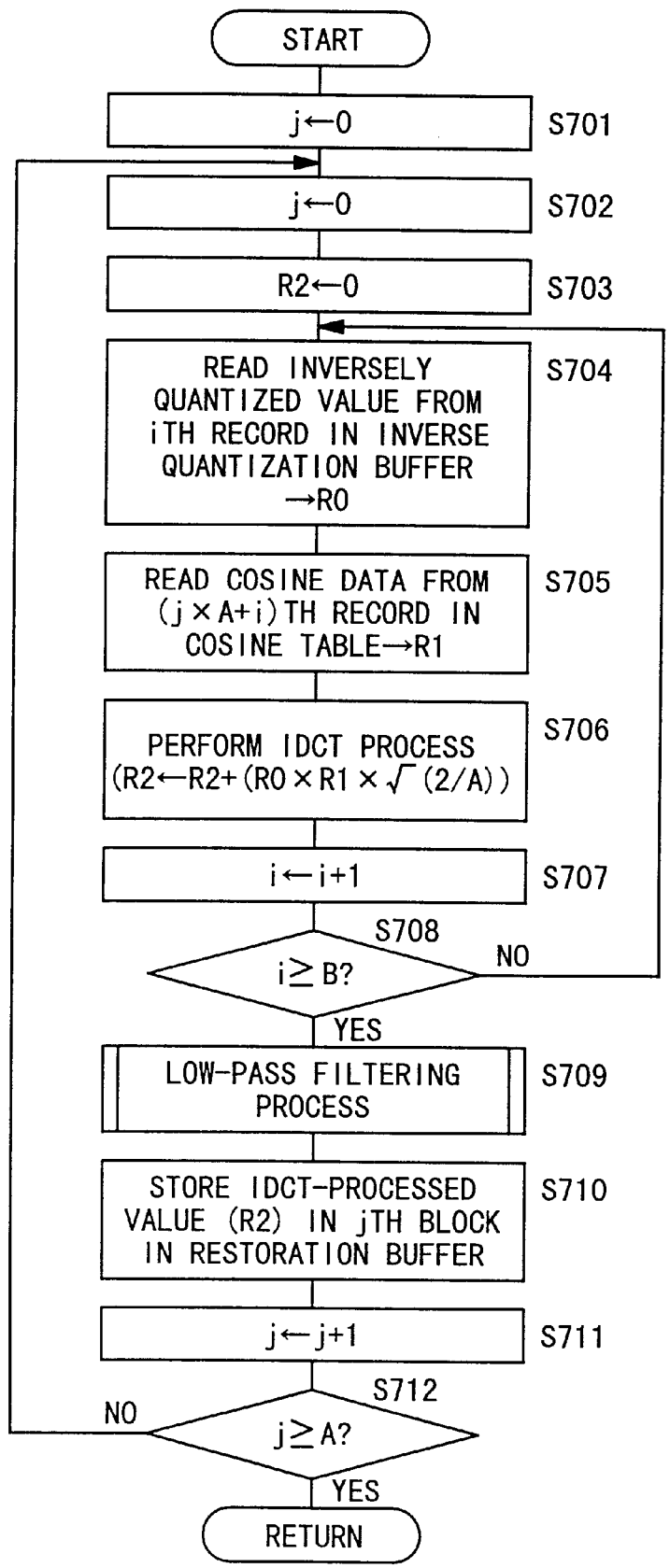
FIG. 25 is a flowchart of a processing sequence of an IDCT processing means.

In step S701 shown in FIG. 25, the IDCT processing means 248 stores an initial value "0" in the index register j used for retrieving blocks, thus initializing the index register j.

In step S702, the IDCT processing means 248 stores an initial value "0" in the index register i used for retrieving records in the inverse quantization buffer, thus initializing the index register i.

In step S703, the IDCT processing means 248 stores an initial value "0" in the accumulating register R2, thus initializing the accumulating register R2.

In step S704, the IDCT processing means 248 reads the quantized value from the ith record in the inverse quantization buffer, and stores the read quantized value in the register R0. In step S705, the IDCT processing means 248 reads the cosine data from the (j×A+1)th record in the cosine table, and stores the read cosine data in the register R1.

In step S706, the IDCT processing means 248 performs an IDCT process. Specifically, the IDCT processing means 248 multiplies the inversely quantized value in the register R0 by the cosine data in the register R1 and $\sqrt{(2/A)}$, and accumulates the result in the accumulating register R2.

In step S707, the IDCT processing means 248 increments the value of the index register i by +1. In step S708, the IDCT processing means 248 decides whether the IDCT process for all frequency ranges for the kth sample has been finished or not.

If the IDCT process for all frequency ranges has not been finished, then control returns to step S704 in order for the IDCT processing means 248 to perform the IDCT process for the next frequency range. If the IDCT process for all frequency ranges has been finished, then control proceeds to step S709 in which the low-pass filter processing means 250 performs its processing.

Of several low-pass filtering processes that are available, two typical low-pass filtering processes will be described below.

Figure 26:
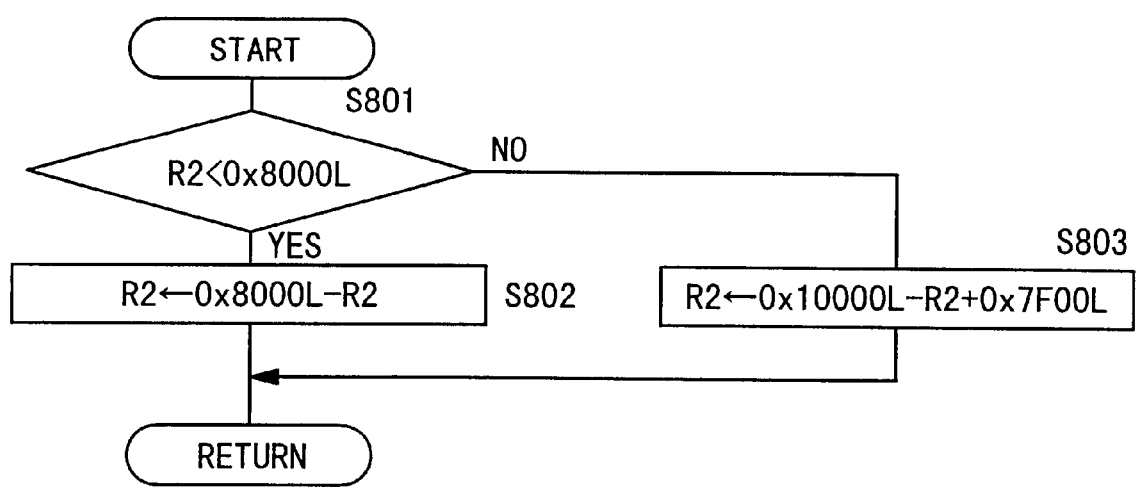
FIG. 26 is a flowchart of a first specific example of operation sequence of a low-pass filter processing means.

According to the first low-pass filtering process, as shown in FIG. 26, if the value of the accumulating register R2 is smaller than 0x8000L in step S801, then control goes to step S802 in which the value of the register R2 is subtracted from 0x8000L and the difference is stored in the register R2. 0x8000L represents double-length data of the hexadecimal value "8000".

If the value of the accumulating register R2 is equal to or greater than 0x8000L in step S801, then control goes to step S803 in which the value of the register R2 is subtracted from 0x10000L, 0x7FOOL is added to the difference, and the sum is stored in the register R2.

Figure 27A:
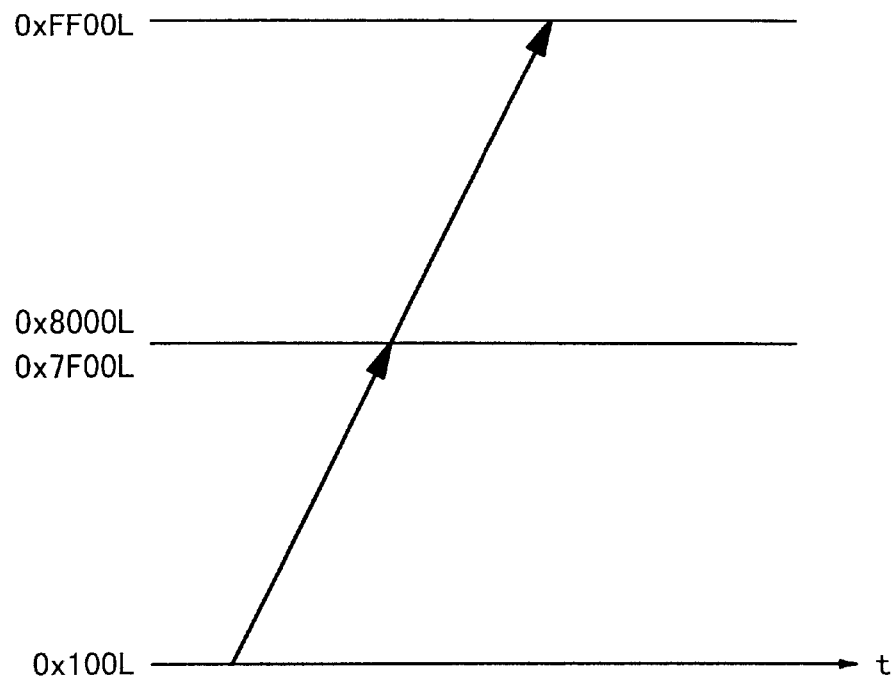
FIG. 27A is a diagram of a changing pattern of audio data restored by an IDCT process.
Figure 27B:
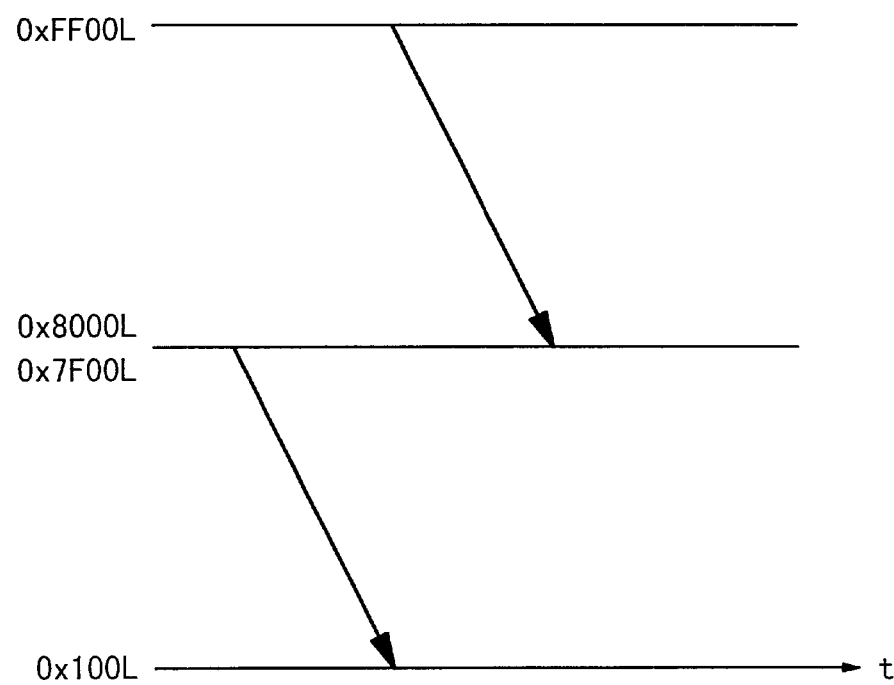
FIG. 27B is a diagram of a changing pattern of audio data after low-pass filter processing (first specific example) corresponding to the changing pattern of audio data shown in FIG. 27A.

With the first low-pass filtering process, when the value of the register R2 increases from 0x100L to 0x7FOOL, as shown in FIG. 27A, the value produced by low-pass filtering changes from 0x7FOOL to 0x100L, as shown in FIG. 27B. When the value of the register R2 increases from 0x8000L to 0xFFOOL, the value produced by low-pass filtering changes from 0xFFOOL to 0x8000L.

Therefore, when the value of the register R2 sharply increases from 0x100L to 0xFFOOL, for example, i.e., when it contains a high-frequency component, the value produced by low-pass filtering changes very slightly from 0x7FOOL to 0x8000L. As a result, the high-frequency component is removed.

Figure 28:
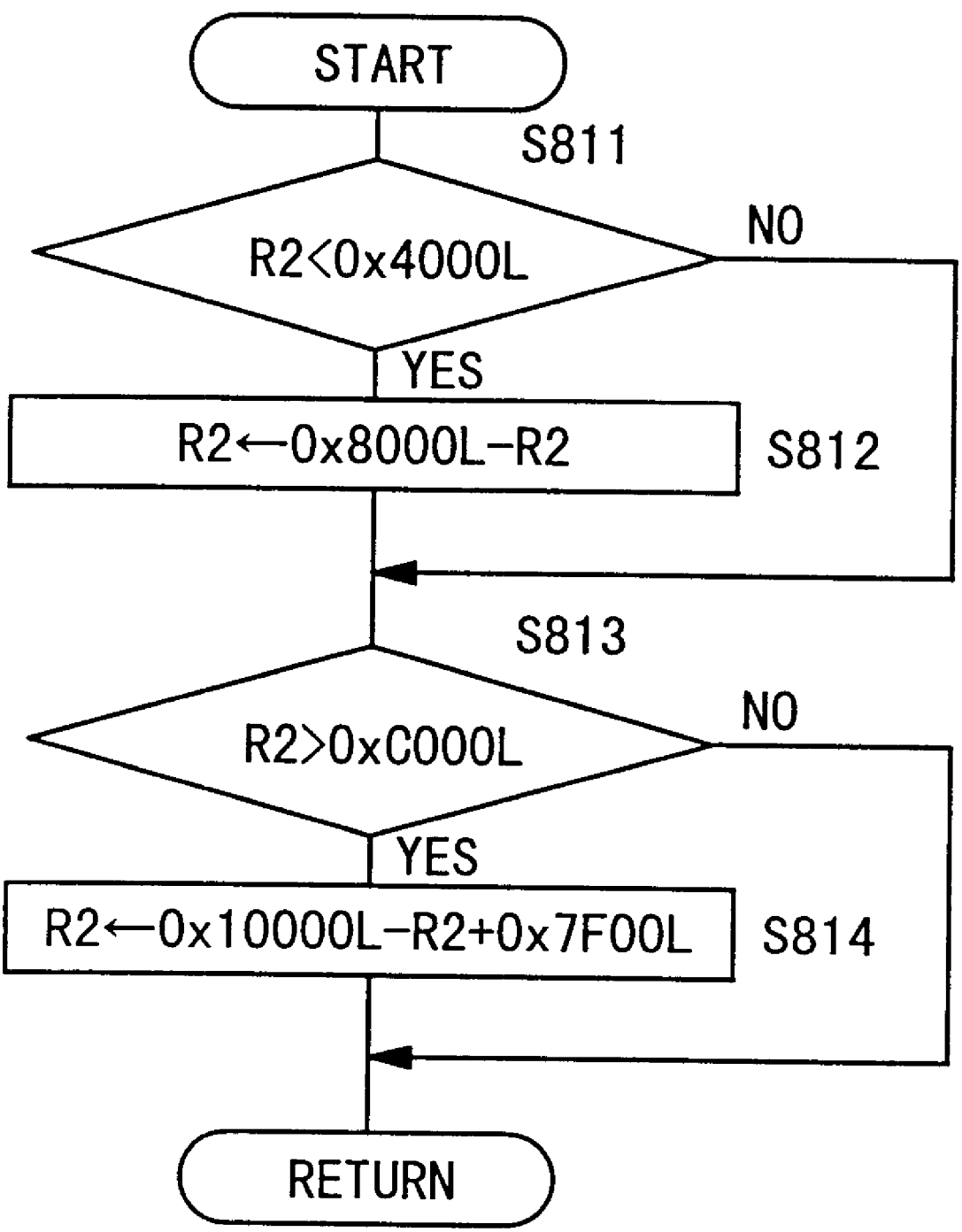
FIG. 28 is a flowchart of a second specific example of operation sequence of the low-pass filter processing means.

According to the second low-pass filtering process, as shown in FIG. 28, if the value of the accumulating register R2 is smaller than 0x8000L in step S811, then control goes to step S812 in which the value of the register R2 is subtracted from 0x8000L and the difference is stored in the register R2.

In step S813, if the value of the accumulating register R2 is greater than 0xCOOOL in step S813, then control goes to step S814 in which the value of the register R2 is subtracted from 0x10000L, 0x7FOOL is added to the difference, and the sum is stored in the register R2.

Figure 29A:
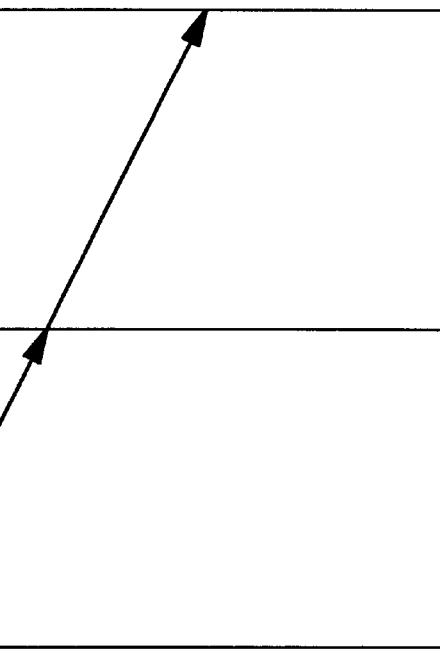
FIG. 29A is a diagram of a changing pattern of audio data restored by an IDCT process.
Figure 29B:
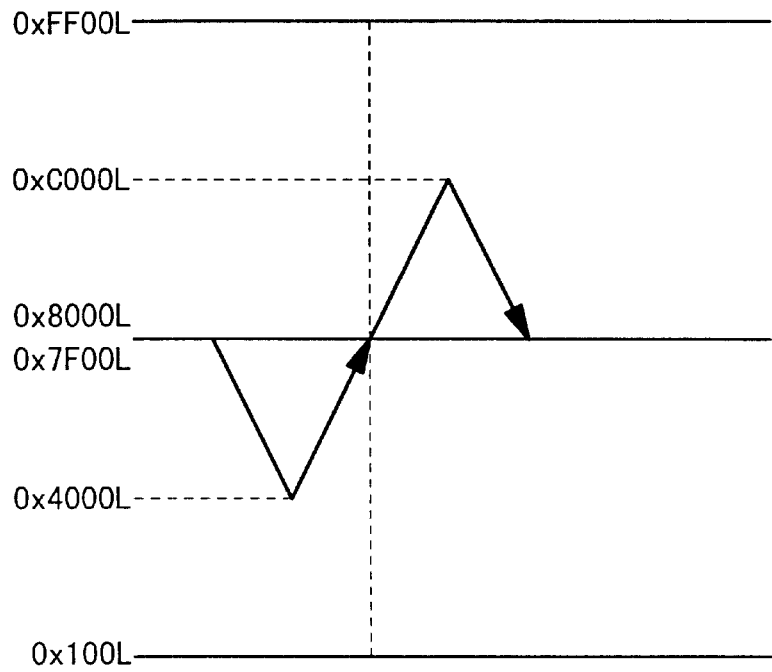
FIG. 29B is a diagram of a changing pattern of audio data after low-pass filter processing (second specific example) corresponding to the changing pattern of audio data shown in FIG. 29A.

With the second low-pass filtering process, when the value of the register R2 increases from 0x100L to 0x3FOOL, as shown in FIG. 29A, the value produced by low-pass filtering changes from 0x7FOOL to 0x4000L, as shown in FIG. 29B. When the value of the register R2 increases from 0x4000L to 0x7FOOL, the value produced by low-pass filtering changes from 0x4000L to 0x7FOOL.

When the value of the register R2 increases from 0x8000L to 0xBFOOL, the value produced by low-pass filtering changes from 0x8000L to 0xBFOOL. When the value of the register R2 increases from 0xCOOOL to 0xFFOOL, the value produced by low-pass filtering changes from 0xCOOOL to 0x8000L.

Therefore, when the value of the register R2 sharply increases a range from 0x100L to 0x3FOOL to a range from 0xCOOOL to 0xFFOOL, for example, i.e., when it contains a high-frequency component, the value produced by low-pass filtering changes slightly from 0x4000L to 0xCOOOL. As a result, the high-frequency component is removed.

Thereafter, in step S710 shown in FIG. 25, the IDCT processing means 248 stores the IDCT-processed value from the register R2 in a jth block in the restoration buffer.

In step S711, the index register j is incremented by +1, and in step S712 the IDCT processing means 248 decides whether the process for one sample (kth sample) has been completed or not by deciding if the current value of j is greater than or equal to A. If the process for one sample has not been completed, then control returns to step S702 in order for the IDCT processing means 248 to perform its IDCT processing on the next block. If the process for one sample has been completed, then the processing sequence of the IDCT processing means 248 is ended.

Control then goes back to the main routine shown in FIG. 23. In step S507, the audio data output means 252 outputs one sample of audio data stored in the restoration buffer to the DAC 156. The DAC 156 converts the supplied audio data to an analog audio signal, which is supplied to the speaker 184. The speaker 184 outputs one sample of sound.

While the audio data is thus being outputted, the buffer defining means 240 newly defines an inverse quantization buffer and a restoration buffer in step S508. Specifically, if the buffer BUF1 has been defined as the present inverse quantization buffer, then the buffer BUF2 is newly defined as the present inverse quantization buffer, and if the buffer BUF11 has been defined as the present restoration buffer, then the buffer BUF12 is newly defined as the present restoration buffer. Conversely, if the buffer BUF2 has been defined as the present inverse quantization buffer, then the buffer BUF1 is newly defined as the present inverse quantization buffer, and if the buffer BUF12 has been defined as the present restoration buffer, then the buffer BUF11 is newly defined as the present restoration buffer.

In step S509, the expansion processing means 202 increments the value of the index register k by +1. Control returns to step S503 in which the sample reading means 242 reads the quantized value of the next sample from the DCT data file. The read quantized value is then subjected to the inverse quantization and the IDCT process.

If the read quantized value is EOD and hence the expansion of all the quantized values is finished in step S504, then the processing sequence of the expansion processing means 202 is ended.

As described above, the portable information terminal 18 has the data memory 142 for storing various data, the expansion processing means 202 for expanding compressed data, on which variable-length coding has not been effected, to restore audio data, the speaker 184 for converting the restored audio data into sound and outputting the sound, and the plural data buffers, i.e., the buffers BUF1, BUF2 as inverse quantization buffers and the buffers BUF11, BUF12 as restoration buffers, that are successively selectively reading and writing at least the audio data and are accessed by at least the expansion processing means 202.

The expansion processing means 202 expands compressed data to restore audio data. Since the expansion processing means 202 expands compressed data that has not been subjected to variable-length coding, it is not necessary to perform a process for decoding the data, and hence the number of steps carried out by the expansion processing means 202 can be reduced. These advantages lead to an ability to quickly restore compressed data without having to increase the storage capacity.

Inasmuch as the plural data buffers are used, no data interference occurs during the processing, and the compressed data can be expanded quickly with high accuracy.

If the number of data based on a processable number that is preset to meet the performance of the speaker 184 is regarded as one sample, then the expansion processing means 202 expands compressed data for each sample. Therefore, compressed data can be expanded depending on the specifications of the portable information terminal 18, preventing sound from being outputted out of synchronism with displayed images.

The IDCT process performed by the IDCT processing means 248 uses a cosine table that has been generated in advance. Therefore, the IDCT process is simplified, and the expansion process can be carried out at a high speed.

The IDCT processing means 248 has the low-pass filter processing means 250 for logically effecting a low-pass filter on IDCT-processed data to reduce a high-frequency component contained in the data. Consequently, the amount of data and the amount of calculations that are handled in the expansion process can be reduced.

For converting audio data into compressed data, it is preferable to carry out a noise reduction process. According to the noise reduction process, a total of samples of original audio data (original total value) and a total of samples of restored audio data, produced by compressing the original audio data and then expanding the compressed audio data (restored total value) are compared with each other. If the restored total value suffers an error of 7% of the original total value, then the original audio data is corrected to reduce noise that is produced after the audio data is restored.

The noise reduction process will specifically be described below with reference to FIGS. 30 through 37.

In step S901 shown in FIG. 30, the cosine table generating means 206 generates a cosine table for an IDCT process (see step S912) to be described later on. The processing in step S901 is the same as the routine shown in FIG. 21, and will not be described below.

In step S902, the compression processing means 204 stores an initial value "0" in the index register m used for retrieving audio data, thus initializing the index register m.

In step S903, the audio data reading means 220 reads mth audio data. In step S904, the process completion deciding means 222 decides whether the noise reduction process for all audio data has been finished or not by deciding whether the read audio data is EOD, i.e., an end of data, or not.

If the noise reduction process has not been finished, then control proceeds to step S905 in which the sample number determining means 224 determines the number C of samples of the present audio data based on the data length of the read audio data.

In step S906, the compression processing means 204 stores an initial value "0" in an updating register Try for the noise reduction process, thus initializing the updating register Try.

In step S907, the DCT processing means 226 effects a DCT process on the present audio data. In step S908, the quantization table generating means 230 performs its process of generating a quantization table. In step S909, the quantizing operation processing means 232 performs its quantizing operation. The DCT process, the process of generating a quantization table, and the quantizing operation are the same as the processing sequence of the DCT processing means 226 shown in FIGS. 13 and 14, the processing sequence of the quantization table generating means 230 shown in FIGS. 17 and 18, and the processing sequence of the quantizing operation processing means 232 shown in FIG. 20, and will not be described below.

In step S910, the compression processing means 204 performs an original totaling process. According to the original totaling process, in step SA01 shown in FIG. 32, the compression processing means 204 stores an initial value "0" in the index register k used for updating samples, thus initializing the index register k.

In step SA02, the compression processing means 204 stores an initial value "0" in the totaling register R0. In step SA03, the compression processing means 204 stores an initial value "0" in the index register j used for retrieving blocks, thus initializing the index register j.

In step SA04, the compression processing means 204 reads PCM data from the (k×A+j)th block in the PCM data file, and stores the read PCM data in the register R1. In step SA05, the compression processing means 204 accumulates the PCM data from the register R1 in the totaling register R0.

In step SA06, the compression processing means 204 increments the value of the index register j by +1. In step SA07, the compression processing means 204 decides whether the process for one sample (kth sample) has been finished or not.

If the process for one sample has not been finished, then control returns to step SA04 for accumulating the PCM data for the next block. If the process for one sample has been finished, then control proceeds to step SA08 in which the compression processing means 204 stores the original total value from the totaling register R0 in the kth record in an original total file.

In step SA09, the compression processing means 204 increments the value of the index register k by +1. In step SA10, the compression processing means 204 decides whether the process for all samples has been finished or not.

If the process for all samples has not been finished, then control goes back to step SA02 to carry out the process for the next sample. If the process for all samples has been finished, then the original totaling process comes to an end. Control then returns to the main routine shown in FIG. 30. In step S911, an inverse quantization process is performed. The inverse quantization process in step S911 is the same as the inverse quantization process shown in FIG. 24 which is carried out by the inverse quantization processing means 246, and will not be described below.

In step S912, the IDCT processing means 248 performs its processing. In step SB01 shown in FIG. 33, the IDCT processing means 248 stores an initial value "0" in the index register k used for updating samples, thus initializing the index register k.

In step SB02, the IDCT processing means 248 stores an initial value "0" in the index register j used for retrieving blocks, thus initializing the index register j.

In step SB03, the IDCT processing means 248 stores an initial value "0" in the accumulating register R2, thus initializing the accumulating register R2.

In step SB04, the IDCT processing means 248 stores an initial value "0" in the index register i used for retrieving records in the DCT data file, thus initializing the index register i.

In step SB05, the IDCT processing means 248 reads the inversely quantized value from the (k×A+i)th record in the DCT data file, and stores the read inversely quantized value in the register R0. In step SB06, the IDCT processing means 248 reads the cosine data from the (j×A+1)th record in the cosine table, and stores the read cosine data in the register R1.

In step SB07, the IDCT processing means 248 performs an IDCT process. Specifically, the IDCT processing means 248 multiplies the inversely quantized value in the register R0 by the cosine data in the register R1 and $\sqrt{(2/A)}$, and accumulates the result in the accumulating register R2.

In step SB08, the IDCT processing means 248 increments the value of the index register i by +1. In step SB09, the IDCT processing means 248 decides whether the IDCT process for all frequency ranges for the kth sample has been finished or not.

If the IDCT process for all frequency ranges has not been finished, then control goes back to step SB05 to perform the IDCT process for the next frequency range. If the IDCT process for all frequency ranges has been finished, then control proceeds to step SB10 in which the IDCT processing means 248 stores the IDCT-processed value from the accumulation register Rr2 in a (k×A+j)th block in the result file.

In step SB11, the index register j is incremented by +1, and in step SB12 the IDCT processing means 248 decides whether the process for one sample (kth sample) has been completed or not by deciding if the current value of j is greater than or equal to A.

If the process for one sample has not been completed, then control goes back to step SB03 in order for the IDCT processing means 248 to perform the IDCT process for the next block. If the process for one sample has been completed, then control proceeds to step SB13 in which the IDCT processing means 248 increments the value of the index register k by +1. In step SB14, the IDCT processing means 248 decides whether the process for all samples has been completed or not.

If the process for all samples has not been completed, then control returns to step SB02 in order for the IDCT processing means 248 to perform the IDCT process for the next sample. If the process for all samples has been completed, then the processing of the IDCT processing means 248 is ended.

Figure 30:
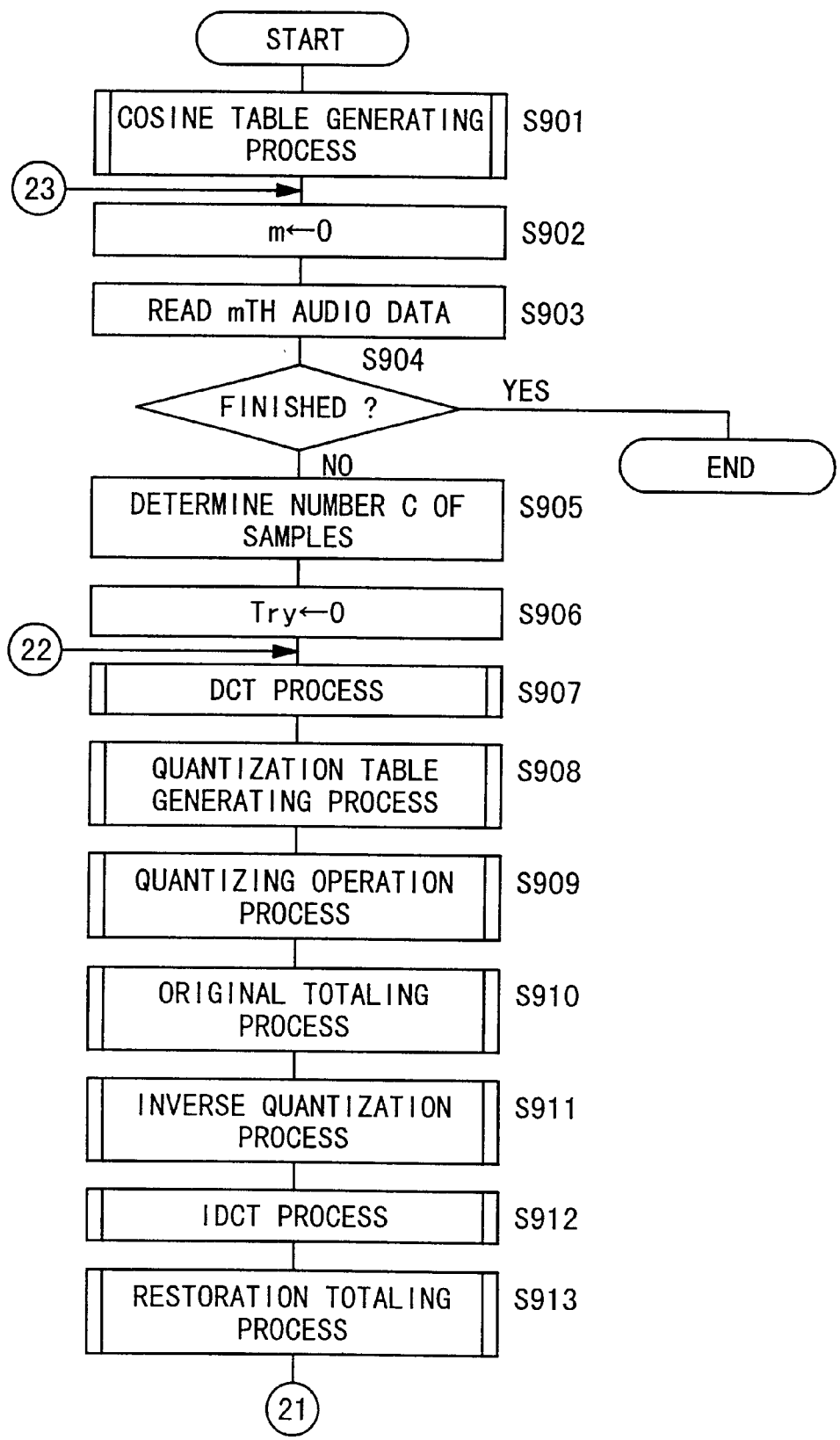
FIGS. 30 and 31 are a flowchart of a noise reduction process.

Control then returns to the main routine shown in FIG. 30. In step S913, the expansion processing means 202 performs a restoration totaling process. According to the restoration totaling process, in step SC01 shown in FIG. 34, the expansion processing means 202 stores an initial value "0" in the index register k used for updating samples, thus initializing the index register k.

In step SC02, the expansion processing means 202 stores an initial value "0" in the totaling register R0. In step SC03, the expansion processing means 202 stores an initial value "0" in the index register j used for retrieving blocks, thus initializing the index register j.

In step SC04, the expansion processing means 202 reads the restored audio data from the (k×A+j)th block in the result file, and stores the read audio data in the register R1. In step SC05, the expansion processing means 202 accumulates the audio data from the register R1 in the totaling register R0.

In step SC06, the expansion processing means 202 increments the value of the index register j by +1. In step SC07, the expansion processing means 202 decides whether the process for one sample (kth sample) has been finished or not based on whether or not the value of the index register j is equal to or greater than the number A of blocks.

If the process for one sample has not been finished, then control goes back to step SC04 in order for the expansion processing means 202 to accumulate the restored audio data of the next block. If the process for one sample has been finished, then control proceeds to step SC08 in which the expansion processing means 202 stores the restored total value from the totaling register R0 in the kth record in the restoration total file.

In step SC09, the expansion processing means 202 increments the value of the index register k by +1. In step SC10, the expansion processing means 202 decides whether the process for all samples has been finished or not.

If the process for all samples has not been finished, then control goes back to step SC02 to carry out the process for the next sample. If the process for all samples has been finished, then the restoration totaling process comes to an end.

Figure 31:
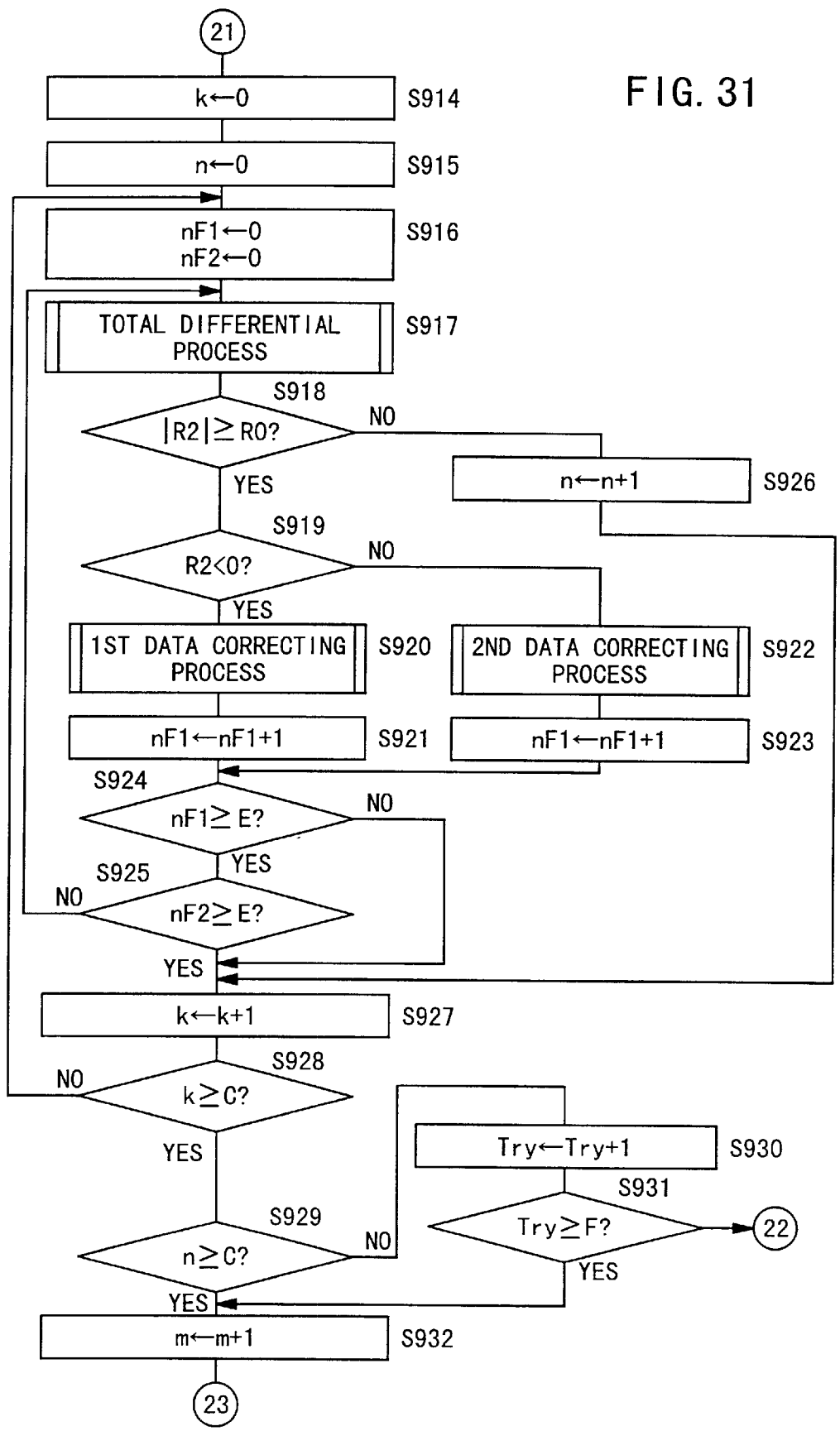
Figure 32:
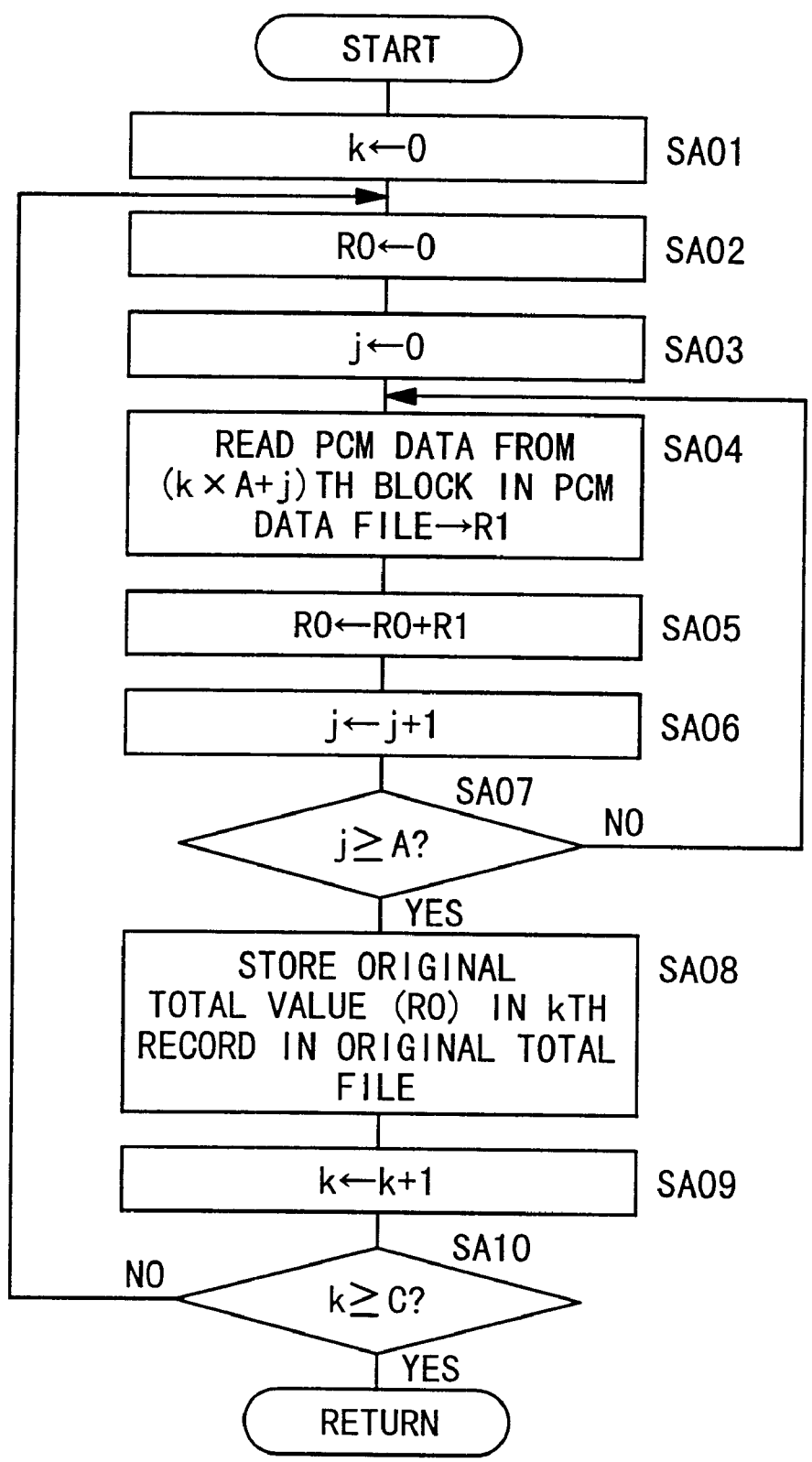
FIG. 32 is a flowchart of an original totaling process.
Figure 33:
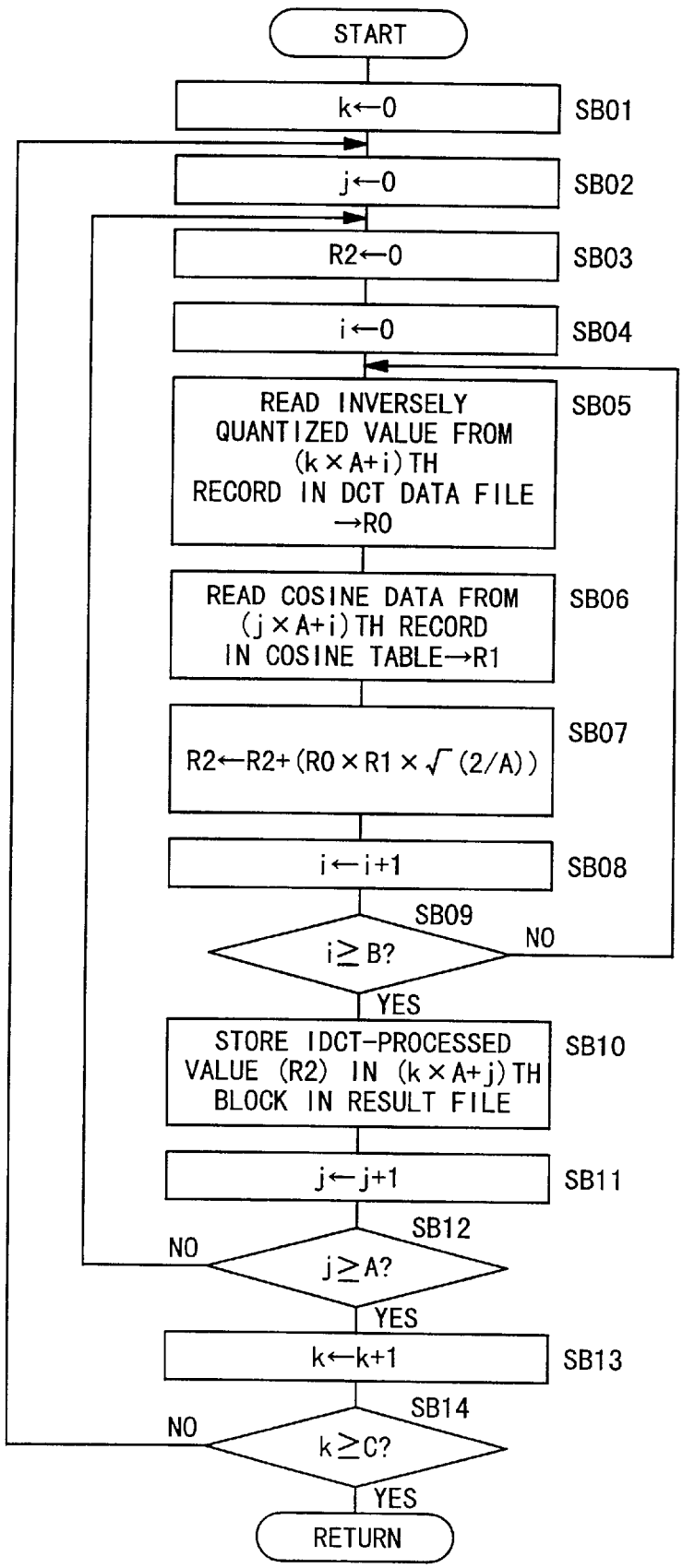
FIG. 33 is a flowchart of an IDCT process in the noise reduction process.
Figure 34:
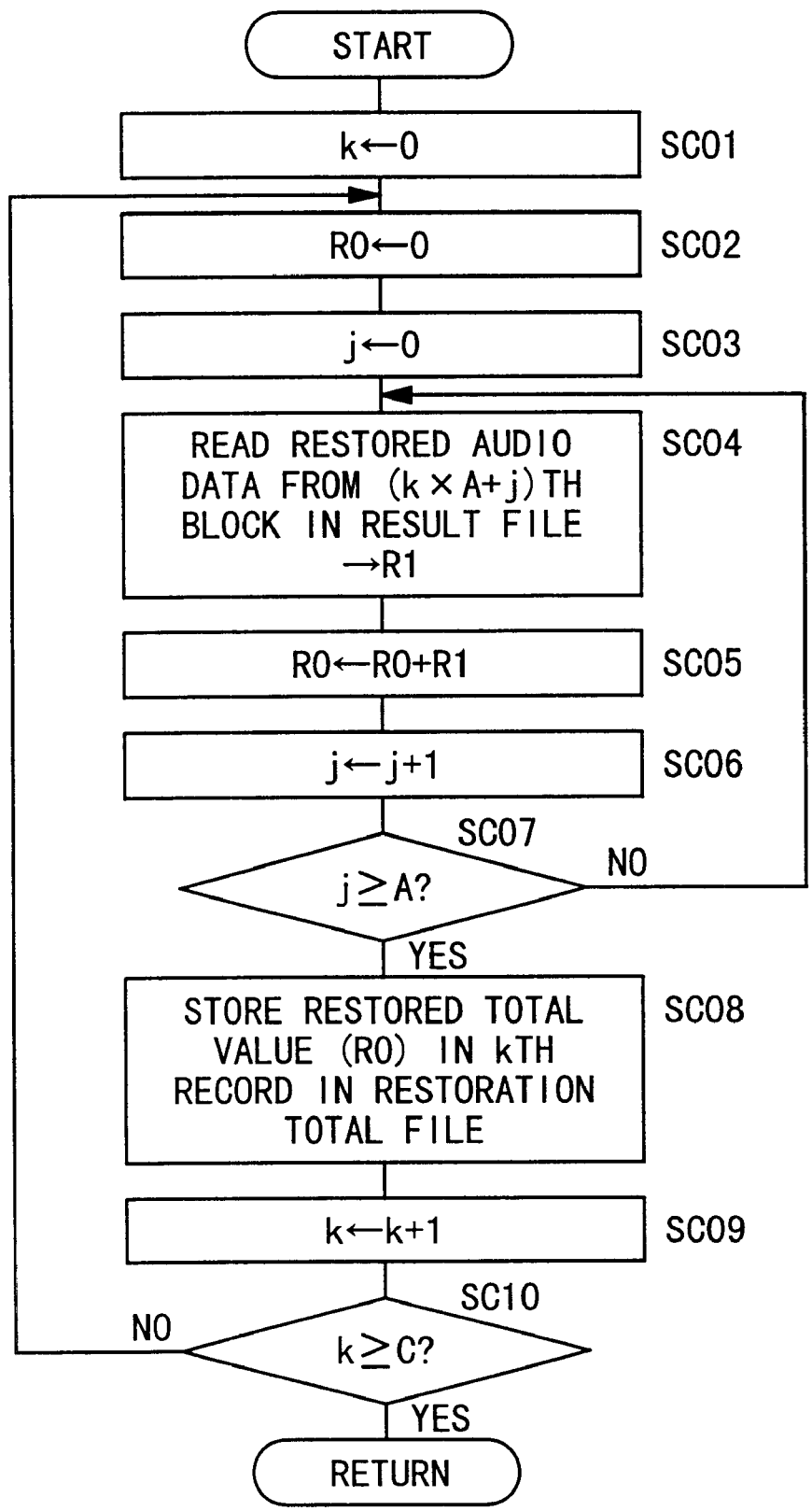
FIG. 34 is a flowchart of a restoration totaling process.
Figure 35:
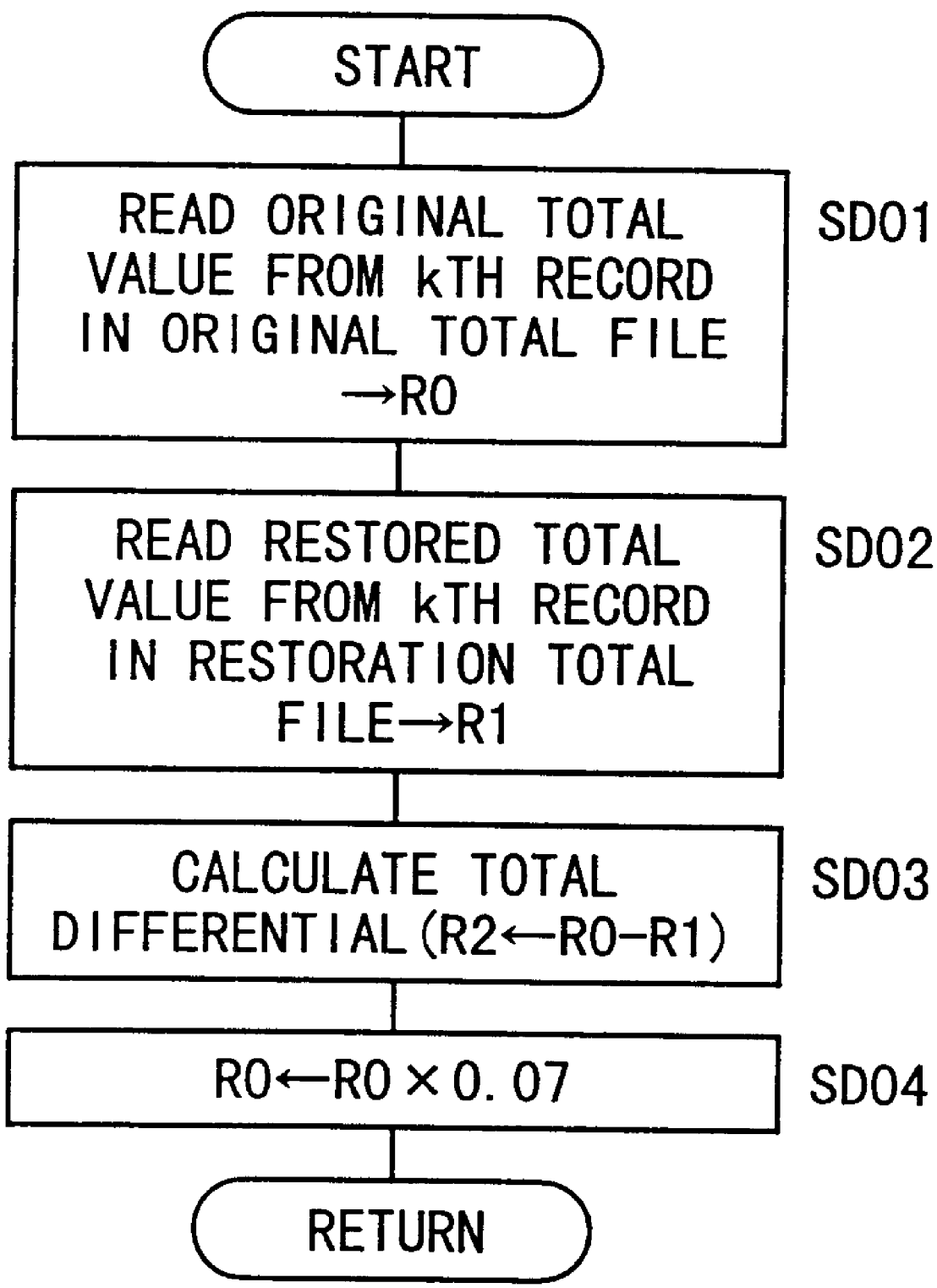
FIG. 35 is a flowchart of a total differential process.

Control then returns to the main routine shown in FIG. 31. In step S914, the expansion processing means 202 stores an initial value "0" in the index register k used for updating samples, thus initializing the index register k.

In step S915, the expansion processing means 202 stores an initial value "0" in an index register n for counting samples of small errors, thus initializing the index register n.

In step S916, the expansion processing means 202 stores an initial value "0" in each of an index register nF1 indicative of a first data correction count and an index register nF2 indicative of a second data correction count, thus initializing the index registers nF1, nF2.

In step S917, the expansion processing means 202 performs a total differential process. According to the total differential process, in step SD01 shown in FIG. 35, the expansion processing means 202 reads the original total value from the kth record in the original total file, and stores the read original total value in the register R0.

In step SD02, the expansion processing means 202 reads the restored total value from the kth record in the restoration total file, and stores the restored total value in the register R1.

In step SD03, the expansion processing means 202 performs a total differential operation. Specifically, the expansion processing means 202 subtracts the restored total value in the register R1 from the original total value in the register R0, and stores the difference in the register R2.

In step SD04, the expansion processing means 202 determines the value of 7% of the original total value, and stores the determined value into the register R0. When the processing in step SD04 is finished, the total differential process is ended.

Control returns to the main routine shown in FIG. 31. In step S918, the expansion processing means 202 decides whether or not the absolute value of the difference in the register R2 is equal to or greater than 7% of the original total value stored in the register R0.

If the absolute value of the difference is equal to or greater than 7% of the original total value, then control goes to step S919 in which the expansion processing means 202 decides whether the difference in the register R2 is negative or not.

If the difference in the register R2 is negative, then control proceeds to step S920 in which the expansion processing means 202 performs a first data correcting process. In the first data correcting process, the expansion processing means 202 multiplies the PCM data in each of the blocks of the sample by 0.98. Thereafter, in step S921, the expansion processing means 202 increments the index register nF1 by +1.

Figure 36:
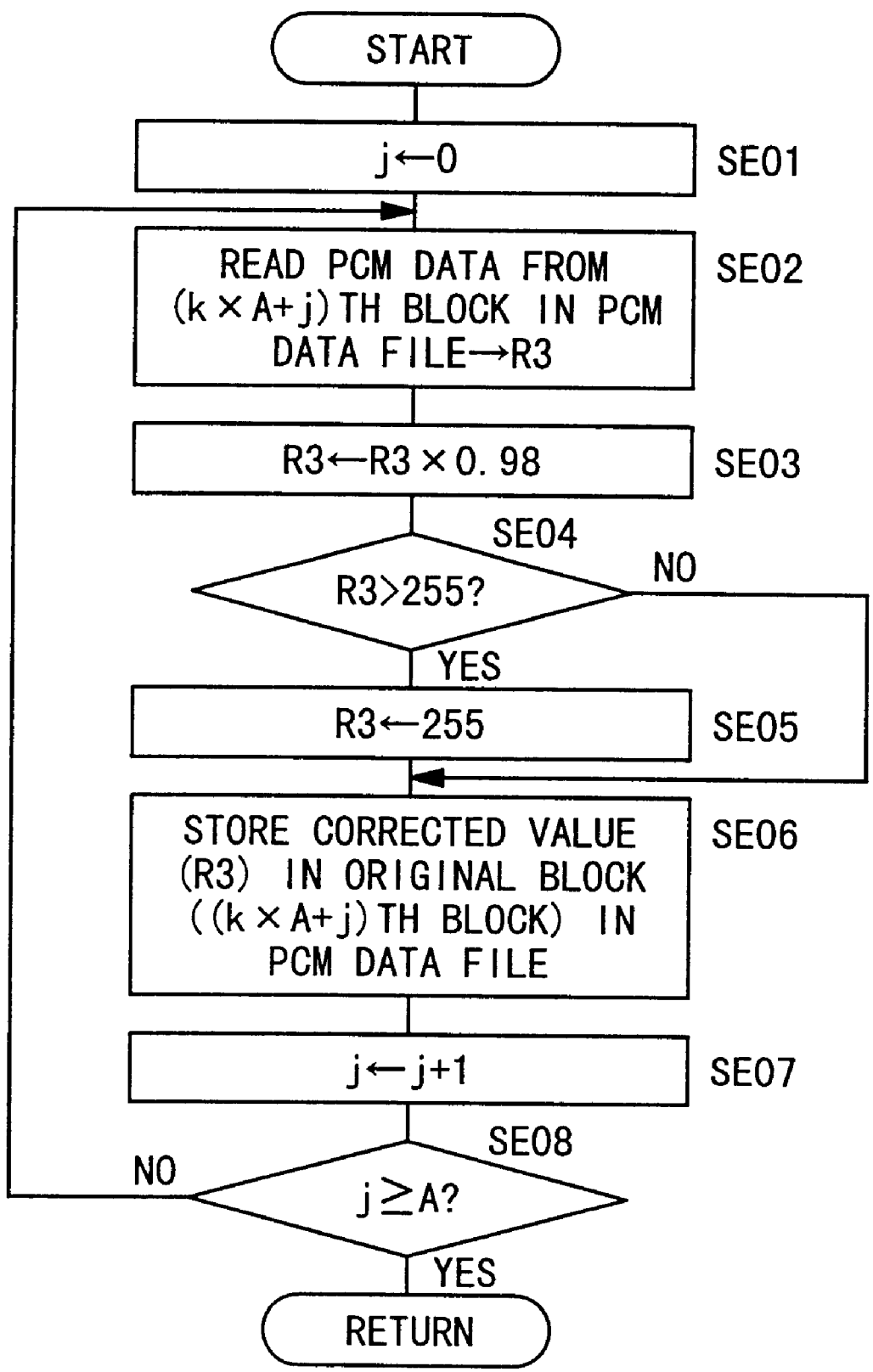
FIG. 36 is a flowchart of a first data correcting process.

The first data correcting process will specifically be described below with reference to FIG. 36. In step SE01, the expansion processing means 202 stores an initial value "0" in the index register j used for retrieving blocks, thus initializing the index register j.

In step SE02, the expansion processing means 202 reads PCM data from the (k×A+j)th block in the PCM data file, and stores the read PCM data in the register R3. In step SE03, the expansion processing means 202 multiplies the PCM data in the register R3 by 0.98, thus correcting the PCM data.

In step SE04, the expansion processing means 202 decides whether the corrected PCM value in the register R3 is greater than a predetermined value, e.g., "255". If the corrected PCM data is greater than 255, then the expansion processing means 202 sets the corrected PCM value to 255, thereby holding the PCM data within a predetermined range in step SE05. This is effective to reduce the amount of data and the amount of calculations that are involved.

In step SE06, the expansion processing means 202 stores the corrected PCM value from the register R3 in the original block ((k×A+j)th block) in the PCM data file.

In step SE07, the expansion processing means 202 increments the value of the index register j by +1. Thereafter, in step SE08, the expansion processing means 202 decides whether the process for one sample (kth sample) has been completed or not based on whether or not the value of the index register j is equal to or greater than the number A of blocks.

If the process for one sample has not been completed, control goes back to step SE02 in order for the expansion processing means 202 to correct the PCM data for the next block. If the process for one sample has been completed, the first data correcting process is ended.

Control returns to the main routine shown in FIG. 31. If the difference in the register R2 is positive in step S919, then control goes to step S922 in which the expansion processing means 202 performs a second data correcting process. In the second data correcting process, the expansion processing means 202 multiplies the PCM data in each of the blocks of the sample by 1.02. Thereafter, in step S923, the expansion processing means 202 increments the index register nF2 by +1.

Figure 37:
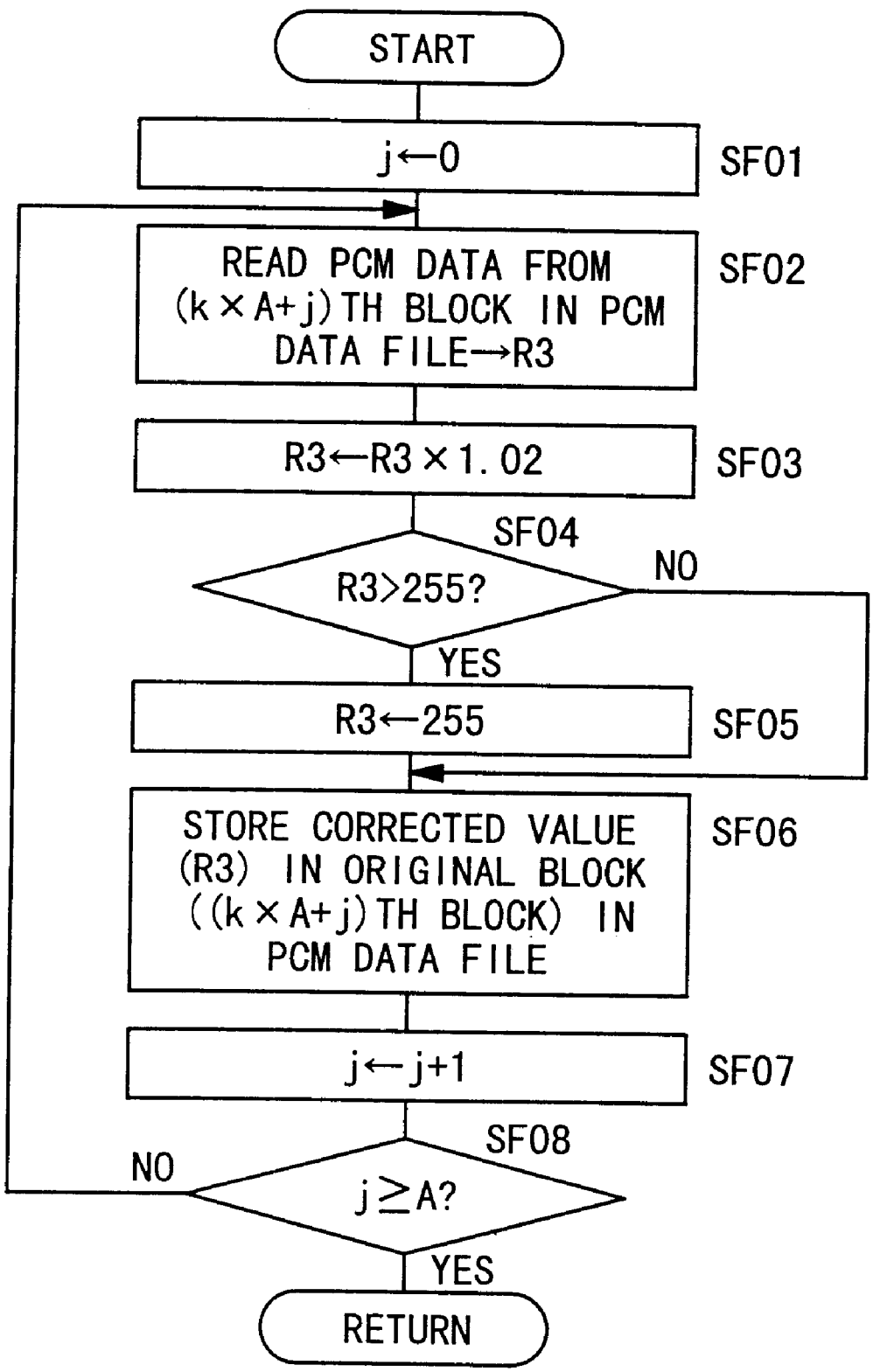
FIG. 37 is a flowchart of a second data correcting process.

The second data correcting process will specifically be described below with reference to FIG. 37. In step SF01, the expansion processing means 202 stores an initial value "0" in the index register j used for retrieving blocks, thus initializing the index register j.

In step SF02, the expansion processing means 202 reads PCM data from the (k×A+j)th block in the PCM data file, and stores the read PCM data in the register R3. In step SF03, the expansion processing means 202 multiplies the PCM data in the register R3 by 1.02, thus correcting the PCM data.

In step SF04, the expansion processing means 202 decides whether the corrected PCM value in the register R3 is greater than a predetermined value, e.g., "255". If the corrected PCM data is greater than 255, then the expansion processing means 202 sets the corrected PCM value to 255, thereby holding the PCM data within a predetermined range in step SF05.

In step SF06, the expansion processing means 202 stores the corrected PCM value from the register R3 in the original block ((k×A+j)th block) in the PCM data file.

In step SF07, the expansion processing means 202 increments the value of the index register j by +1. Thereafter, in step SF08, the expansion processing means 202 decides whether the process for one sample (kth sample) has been completed or not.

If the process for one sample has not been completed, control goes back to step SF02 in order for the expansion processing means 202 to correct the PCM data for the next block. If the process for one sample has been completed, the second data correcting process is ended.

Control returns to the main routine shown in FIG. 31. In step S924, the expansion processing means 202 decides whether the first data correcting process has been carried out a predetermined number of times or more based on whether or not the value of the index register nF1 is equal to or greater than a predetermined value E, e.g., "8".

If the value of the index register nF1 is smaller than the predetermined value, then the expansion processing means 202 decides in step S925 whether the second data correcting process has been carried out a predetermined number of times or more based on whether or not the value of the index register nF2 is equal to or greater than a predetermined value E, e.g., "8".

If the value of the index register nF2 is smaller than the predetermined value, then control goes back to step S917 to calculate a total difference based on the corrected PCM data, detect an error between the original total and the restored total, and performs the process depending on the error.

If the absolute value of the difference is smaller than 7% of the original total value, then control goes to step S926 in which the expansion processing means 202 increments the value of the index register n by +1.

If the value of the index register nF1 or the value of the index register nF2 is equal to or greater than the predetermined value E, or after the processing in step S926, control goes to step S927 in which the expansion processing means 202 increments the value of the register k by +1. Thereafter, in step S928, the expansion processing means 202 decides whether the detection of errors for all samples and the process based on the detected errors have been completed or not.

If the process for all samples has not been completed, then control goes back to step S916 in order for the expansion processing means 202 to carry out the process for the next sample. If the process for all samples has been completed, then control goes to step S929 in which the expansion processing means 202 decides whether the errors for all samples are small or not.

If the error for at least one of all samples is large, then control goes to step S930 in which the expansion processing means 202 increments the value of an updating register Try for retry by +1.

In step S931, the expansion processing means 202 decides whether there is a sample whose error is equal to or greater than 7% after a predetermined number of retries (the detection of an error and the process based on the detected error), based on whether or not the value of the updating register Try is equal to or greater than a predetermined number F, e.g., "16".

If the predetermined number of retries is not reached, then control goes back to step S907 shown in FIG. 30, and the compression and expansion processes, the error detection, and the process based on the detected error (data correction) according to the corrected PCM data are carried out.

If the value of the index register n is equal to or greater than the present sample in step S929, or if the value of the updating register Try is equal to or greater than the predetermined number in step S931, then control goes to step S932 in which the expansion processing means 202 increments the value of the index register m by +1. Thereafter, control returns to step S903 for carrying out the noise reduction process for the next audio data.

If the noise reduction process for all audio data is finished in step S904, then the noise reduction process comes to an end.

As described above, the noise reduction process is carried out when compressed data is generated from audio data. Therefore, when the portable information terminal 18 expands the compressed data and outputs sound, noise contained in the sound is reduced, and hence the portable information terminal 18 can output high-quality sound.

Although certain preferred embodiments of the present invention have been shown and described in detail, it should be understood that various changes and modifications may be made therein without departing from the scope of the appended claims.

What is claimed is:

1. A portable information terminal comprising:
    a memory for storing data;
    expansion processing means stored in said memory, for expanding compressed data which has not been subjected to variable-length coding into audio data;
    sound output means for converting the audio data into sound and outputting the sound; and
    a plurality of data buffers accessible by at least said expansion processing means, for successively selectively reading and writing at least said audio data.

2. A portable information terminal according to claim 1, wherein the number of data based on a processable number that is preset to meet the performance of at least said sound output means is regarded as one sample, and said expansion processing means comprises means for expanding the compressed data for each sample.

3. A portable information terminal according to claim 1, wherein said expansion processing means comprises:
   inverse quantization processing means for inversely quantizing said compressed data into inversely quantized data;
   inverse direct cosine transform (IDCT) processing means for effecting an IDCT process on said inversely quantized data to produce said audio data; and
   said plurality of data buffers including:
      two inverse quantization buffers accessible for successively selectively reading and writing said inversely quantized data; and
      two audio data buffers accessible for successively selectively reading and writing said audio data.

4. A portable information terminal according to claim 3, wherein said IDCT processing means comprises means for effecting the IDCT process using a cosine table which has been generated in advance.

5. A portable information terminal according to claim 3, wherein said IDCT processing means has low-pass filter processing means for logically effecting a low-pass filter on IDCT-processed data to reduce a high-frequency component contained therein.

6. A portable information terminal according to claim 1, further comprising:
   communication means for sending data to and receiving data from an external device;
   said compressed data comprising data stored in said memory via said communication means.

7. A portable information terminal according to claim 6, wherein said compressed data comprises data which is produced when uncompressed data recorded in a recording medium accessible via said external device is compressed by said external device.

8. A portable information terminal according to claim 6, wherein said compressed data comprises data which is recorded in a recording medium accessible via said external device and compressed when recorded in said recording medium.

9. A portable information terminal according to claim 7, wherein said uncompressed data is compressed by effecting a DCT process on the uncompressed data to produce DCT-processed data and quantizing the DCT-processed data.

10. A portable information terminal according to claim 9, wherein said DCT-processed data is quantized by determining maximum values at respective frequencies of the DCT-processed data to generate a quantization table containing the maximum values at the respective frequencies, and dividing the DCT-processed data by the maximum values at the respective frequencies in the quantization table to produce quantized data.

11. A portable information terminal according to claim 6, wherein said compressed data comprises data containing reduced noise.

12. A portable information terminal according to claim 11, wherein the noise is reduced by calculating a total of samples in original data to produce an original total value, compressing the original data and expanding the compressed original data to produce restored data, calculating a total of samples in the restored data to produce a restored total value, comparing said original total value and said restored total value with each other, and correcting said original data depending on the result of comparison.

13. A method of processing audio data, comprising the steps of:
   expanding compressed data which has not been subjected to variable-length coding, into audio data, using a plurality of data buffers accessible for successively selectively reading and writing at least said audio data; and
   outputting the audio data to sound output means to output sound.

14. A method according to claim 13, wherein the number of data based on a processable number that is preset to meet the performance of at least said sound output means is regarded as one sample, and said step of expanding compressed data comprises the step of expanding the compressed data for each sample.

15. A method according to claim 13, wherein said step of expanding compressed data comprises the steps of:
   inversely quantizing said compressed data into inversely quantized data; and
   effecting an IDCT process on said inversely quantized data to produce said audio data;
   the arrangement being such that said inversely quantized data is successively selectively read and written using two inverse quantization buffers, and said audio data is successively selectively read and written using two audio data buffers.

16. A method according to claim 15, wherein said step of effecting an IDCT process comprises the step of effecting the IDCT process using a cosine table which has been generated in advance.

17. A method according to claim 15, wherein said step of effecting an IDCT process comprises the step of logically effecting a low-pass filter on IDCT-processed data to reduce a high-frequency component contained therein.

18. A method according to claim 15, further comprising the step of generating said compressed data, said step of generating said compressed data comprising the steps of:
   effecting a DCT process on uncompressed data to produce DCT-processed data; and
   quantizing the DCT-processed data.

19. A method according to claim 18, wherein said step of quantizing the DCT-processed data comprises the steps of:
   determining maximum values at respective frequencies of the DCT-processed data to generate a quantization table containing the maximum values at the respective frequencies; and
   dividing the DCT-processed data by the maximum values at the respective frequencies in the quantization table to produce quantized data.

20. A method according to claim 13, wherein said compressed data comprises data containing reduced noise.

21. A method according to claim 20, further comprising the step of reducing noise, said step of reducing noise comprising the steps of:
   calculating a total of samples in original data to produce an original total value;
   compressing the original data and expanding the compressed original data to produce restored data;
   calculating a total of samples in the restored data to produce a restored total value;
   comparing said original total value and said restored total value with each other, and correcting said original data depending on the result of comparison.

22. A recording medium which stores a program operable on a portable information terminal having a memory for storing data, sound output means for converting audio data into sound and outputting the sound, a plurality of data buffers accessible for successively selectively reading and writing at least said audio data, said portable information terminal also storing data referred to by said program, said program comprising the step of:

expanding compressed data which has not been subjected to variable-length coding, stored in said memory, using said data buffers, thereby to produce audio data.

23. A recording medium according to claim 22, wherein the number of data based on a processable number that is preset to meet the performance of at least said sound output means is regarded as one sample, and said step of expanding compressed data comprises the step of expanding the compressed data for each sample.

24. A recording medium according to claim 22, wherein said portable information terminal has two inverse quantization buffers accessible for successively selectively reading and writing said inversely quantized data, and two audio data buffers accessible for successively selectively reading and writing said audio data, said step of expanding compressed data comprises the steps of:

inversely quantizing said compressed data into inversely quantized data; and effecting an IDCT process on said inversely quantized data to produce said audio data.

25. A recording medium according to claim 22, wherein said step of effecting an IDCT process comprises the step of effecting the IDCT process using a cosine table which has been generated in advance.

26. A recording medium according to claim 22, wherein said step of effecting an IDCT process comprises the step of logically effecting a low-pass filter on IDCT-processed data to reduce a high-frequency component contained therein.

27. A recording medium according to claim 22, which stores said compressed data as well as said program.

28. A recording medium according to claim 22, wherein said program comprises the step of:

compressing uncompressed data;

said uncompressed data as well as said program being stored in said recording medium.

29. A recording medium according to claim 28, wherein said step of compressing uncompressed data comprises the steps of:

effecting a DCT process on the uncompressed data to produce DCT-processed data; and quantizing the DCT-processed data.

30. A recording medium according to claim 29, wherein said step of quantizing the DCT-processed data comprises the steps of:

determining maximum values at respective frequencies of the DCT-processed data to generate a quantization table containing the maximum values at the respective frequencies; and dividing the DCT-processed data by the maximum values at the respective frequencies in the quantization table to produce quantized data.

31. A recording medium according to claim 22, wherein said compressed data comprises data containing reduced noise.

32. A recording medium according to claim 31, further comprising the step of reducing noise, said step of reducing noise comprising the steps of:

calculating a total of samples in original data to produce an original total value;

compressing the original data and expanding the compressed original data to produce restored data;

calculating a total of samples in the restored data to produce a restored total value;

comparing said original total value and said restored total value with each other; and correcting said original data depending on the result of comparison.

33. A program operable on a portable information terminal having a memory for storing data, sound output means for converting the audio data into sound and outputting the sound, a plurality of data buffers accessible for successively selectively reading and writing at least said audio data, said portable information terminal also storing data referred to by said program, said program being readable and executable by a computer, said program comprising the step of:

expanding compressed data which has not been subjected to variable-length coding, stored in said memory, using said data buffers, thereby to produce audio data.

* * * * *